United States Patent
Cooper et al.

(10) Patent No.: US 10,132,943 B2
(45) Date of Patent: Nov. 20, 2018

(54) SPECTRAL SEGMENTATION FOR OPTIMIZED SENSITIVITY AND COMPUTATION IN ADVANCED RADIATION DETECTORS

(71) Applicant: Passport Systems, Inc., Billerica, MA (US)

(72) Inventors: Daniel A. Cooper, Acton, MA (US); James B. Costales, Winchester, MA (US); Krzysztof E. Kamieniecki, Acton, MA (US); Alexei V. Klimenko, Santa Fe, NM (US); Robert J. Ledoux, Harvard, MA (US); Jeffrey K. Thompson, Woburn, MA (US)

(73) Assignee: Passport Systems, Inc., Billerica, MA (US)

( * ) Notice: Subject to any disclaimer, the term of this patent is extended or adjusted under 35 U.S.C. 154(b) by 1278 days.

(21) Appl. No.: 14/237,088

(22) PCT Filed: Jan. 21, 2014

(86) PCT No.: PCT/US2014/012330
§ 371 (c)(1),
(2) Date: Feb. 4, 2014

(87) PCT Pub. No.: WO2014/133687
PCT Pub. Date: Sep. 4, 2014

(65) Prior Publication Data
US 2017/0003404 A1    Jan. 5, 2017

Related U.S. Application Data

(60) Provisional application No. 61/755,030, filed on Jan. 22, 2013.

(51) Int. Cl.
| G01T 1/36 | (2006.01) |
|---|---|
| G01T 1/29 | (2006.01) |
| G01T 7/00 | (2006.01) |

(52) U.S. Cl.
CPC .............. *G01T 1/36* (2013.01); *G01T 1/29* (2013.01); *G01T 7/00* (2013.01)

(58) Field of Classification Search
None
See application file for complete search history.

(56) References Cited

U.S. PATENT DOCUMENTS

| 3,976,878 A | * | 8/1976 | Chevalier | ................ G01V 5/06 |
|---|---|---|---|---|
| | | | | 250/253 |
| 5,475,727 A | * | 12/1995 | Buchanan | ................ G01T 1/40 |
| | | | | 378/53 |

(Continued)

FOREIGN PATENT DOCUMENTS

GB    2455906 A    7/2009

OTHER PUBLICATIONS

International Search Report and Written Opinion for PCT/US2014/012330, dated Oct. 7, 2014.

(Continued)

*Primary Examiner* — Thomas R Artman
(74) *Attorney, Agent, or Firm* — Foley Hoag LLP; Rajesh Vallabh

(57) ABSTRACT

Efficient techniques and devices for detecting, locating, tracking, and identifying radiation sources using a network of one or more detectors are disclosed.

106 Claims, 10 Drawing Sheets

(56) References Cited

U.S. PATENT DOCUMENTS

| | | | |
|---|---|---|---|
| 5,504,333 A * | 4/1996 | Yamakawa | G01T 1/1642 250/363.07 |
| 6,201,257 B1 * | 3/2001 | Stettner | B82Y 10/00 257/10 |
| 8,041,007 B2 | 10/2011 | Ledoux et al. | |
| 8,274,056 B2 | 9/2012 | Akers et al. | |
| 2007/0023662 A1 | 2/2007 | Brady et al. | |
| 2007/0034808 A1 * | 2/2007 | Evans | G01T 1/167 250/371 |
| 2007/0295898 A1 | 12/2007 | Proctor | |
| 2008/0191887 A1 | 8/2008 | Mullikin et al. | |
| 2011/0174983 A1 | 7/2011 | Benke | |
| 2011/0228896 A1 | 9/2011 | Peschmann | |
| 2012/0224669 A1 | 9/2012 | Ledoux et al. | |
| 2017/0003404 A1 * | 1/2017 | Cooper | G01T 1/29 |

OTHER PUBLICATIONS

European Search Report for EP1475664.0, dated Aug. 29, 2016.
Cooper, et al., "Intelligent Radiation Sensor System (IRSS) Advanced Technology Demonstration (ATD)", Technologies for Homeland Security (HST), 2010 IEEE International Conference on, IEEE, Piscataway, NJ, USA, Nov. 8, 2010 (Nov. 8, 2010), pp. 414-420.
Cooper, et al., "Intelligent Radiation Sensor System (IRSS) advanced technology demonstrator (ATD)". Homeland Security (HST). 2012 IEEE Conference on Technologies for, IEEE. Nov. 13, 2012 (Nov. 13, 2012), pp. 511-516.
Singapore Search Report and Written Opinion for Singapore Patent Application No. 11201505378Y, dated Jun. 9, 2016.

* cited by examiner

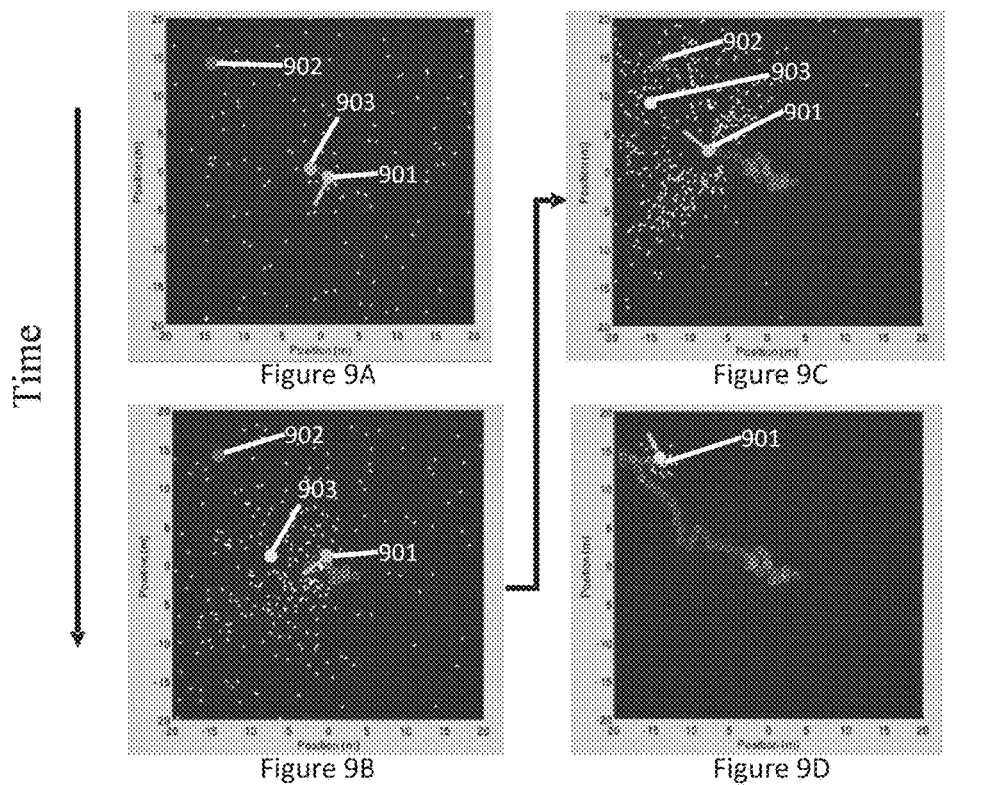

SPECTRAL SEGMENTATION FOR OPTIMIZED SENSITIVITY AND COMPUTATION IN ADVANCED RADIATION DETECTORS

CROSS-REFERENCE TO RELATED APPLICATIONS

This application is the national stage entry of international application no. PCT/US2014/012330, filed Jan. 21, 2014, and claims priority to and the benefit of U.S. Provisional Application Ser. No. 61/775,030, entitled "SPECTRAL SEGMENTATION FOR OPTIMIZED SENSITIVITY AND COMPUTATION IN ADVANCED RADIATION DETECTORS," filed Jan. 22, 2013 by Daniel A. Cooper, James B. Costales, Krzysztof Kamieniecki, Alexei V. Klimenko, Robert J. Ledoux, and Jeffrey K. Thompson, both of which are hereby incorporated herein by reference in their entirety.

BACKGROUND

Portable radiation detection equipment—meant to be conveniently worn or carried by a user—is frequently subject to an inherent tradeoff between capability and size. Current off-the-shelf devices may be limited in terms of the on-board processing power available and/or the sensitivity of the active radiation sensing element. Typically, detection in such devices is based on the number of counts received over a wide range of gamma ray energies and the algorithms used to process this integrated count data are relatively simple.

Some newer portable radiation detectors now may provide full spectroscopic capability and this may require greater complexity in the signal processing requirements. There are several devices currently available that may process the full spectrum (up to roughly 3000 keV) to allow for the identification of standard radioisotopes based on spectroscopic signatures. That is a significant operational improvement.

The next generation of detectors is expected also to provide for the integration of data from multiple independent detectors for improved overall performance. Even more than with the processing of the spectroscopic data from a single detector, the integration of raw data across multiple detectors may require significant processing capability. Typically, the necessary probabilistic fusion algorithms could exhaust the computational capacity of modern laptop computing platforms, much less the processing capability available in a hand-held or belt-mounted radiation detector.

SUMMARY

Efficient techniques and devices for detecting, locating, tracking, and identifying radiation sources using a network of one or more detectors are disclosed.

BRIEF DESCRIPTION OF THE DRAWINGS

FIGS. 9A-9D show a simulated search scheme directed by a particle filtering process.

DETAILED DESCRIPTION

Spectral Segmentation and Binning

In order to analyze a detected spectrum and determine the identity of the source(s) which produced it, the bandwidth over which the spectrum is measured can be segmented into a finite number of bins. The objective of the binning process is to divide the spectrum into bins covering photopeaks associated with isotopes of interest, while separating out parts of the spectrum expected to include only background radiation into separate bins. It may also be appropriate to limit the number of bins to achieve computational feasibility.

While the binning processes described below proceed by deterministic series of steps, in some cases a user will have a priori knowledge that a particular photopeak is of great interest. In that case, the process to be utilized may be subjected to the additional constraint that there must be a single bin centered on the photopeak of interest, and this disclosure is intended to encompass both processes that include such additional constraints based on a priori knowledge and those that do not.

The process of segmenting the bandwidth starts by obtaining or preparing a list of isotopes of interest, which might be present and detected by the detector(s) in the environment in which they may be operating. The list may include for example, special nuclear materials, medical isotopes, industrial isotopes, and/or isotopes which are part of the Naturally-Occurring Radioactive Material (NORM) background, which is always present, including, for example, $^{40}$K. Table 1 includes an exemplary list of isotopes of interest and isotopes useful for estimating background gamma radiation, although other isotopes of interest may also be included and this disclosure is not limited to the use of all of the isotopes in Table 1, or only those isotopes.

Figure 1:
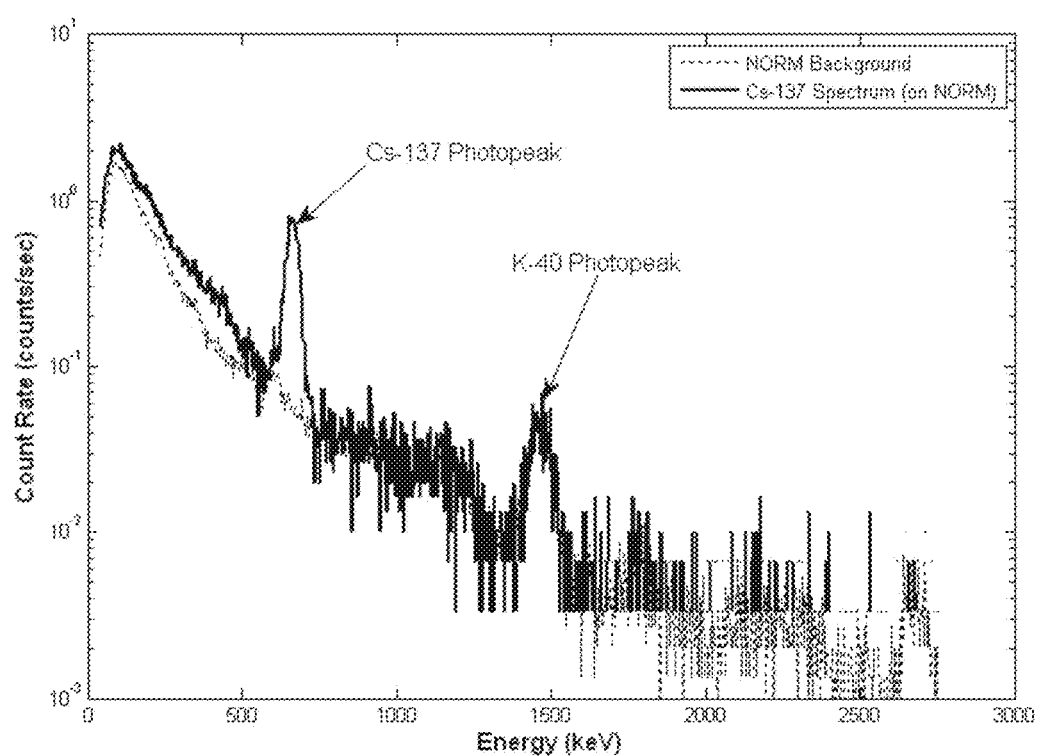
FIG. 1 shows a sample spectrum from 30 to 3000 keV showing a Naturally-Occurring Radioactive Material (NORM) background (including the $^{40}$K peak) and a $^{137}$Cs spectrum.
Figure 2:
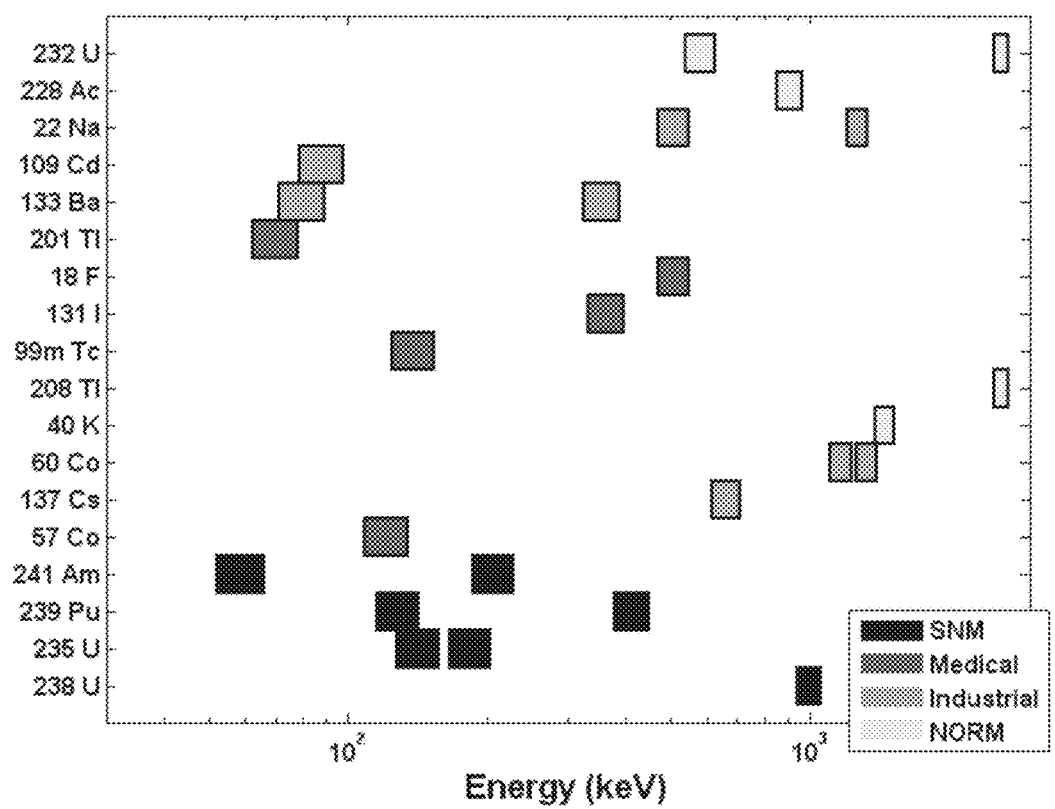
FIG. 2 shows the energy range from 30 to 3000 keV, with each specified isotope's photopeaks indicated by boxes to the right of that isotope.

Once the isotopes of interest have been identified and the list is complete the spectral location and width of strong gamma-ray spectral lines (photopeaks) for each such isotope are noted. An example of a strong spectral line for a potential isotope of interest is shown in FIG. 1 for $^{137}$Cs, a commonly used industrial isotope. Depending on the width and location of photopeaks, multiple peaks may, but do not necessarily, overlap. The location and width of photopeaks for an exemplary set of isotopes are shown in FIG. 2.

Figure 3:
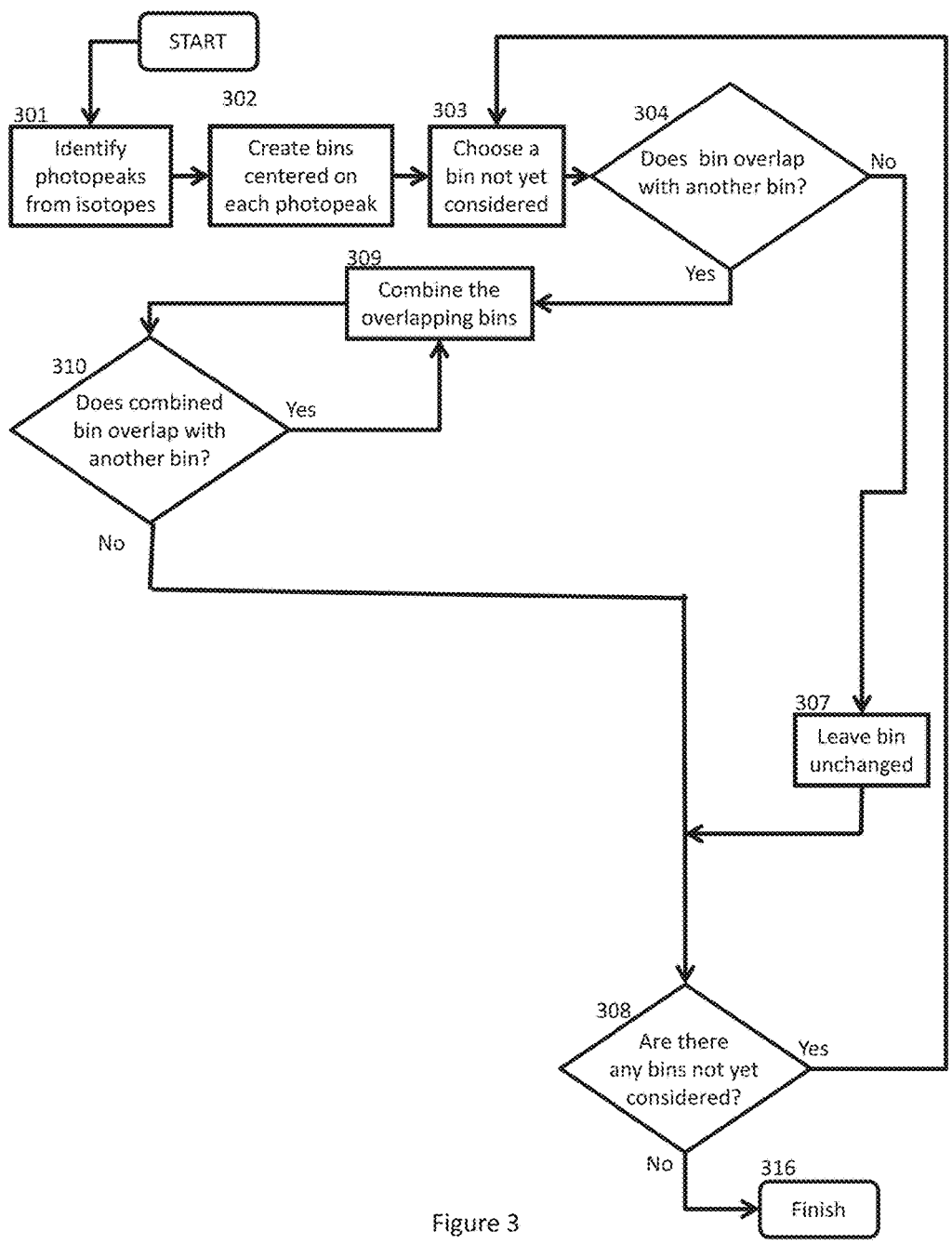
FIG. 3 shows a flowchart explaining one particular way of segmenting a spectrum into bins.
Figure 5:
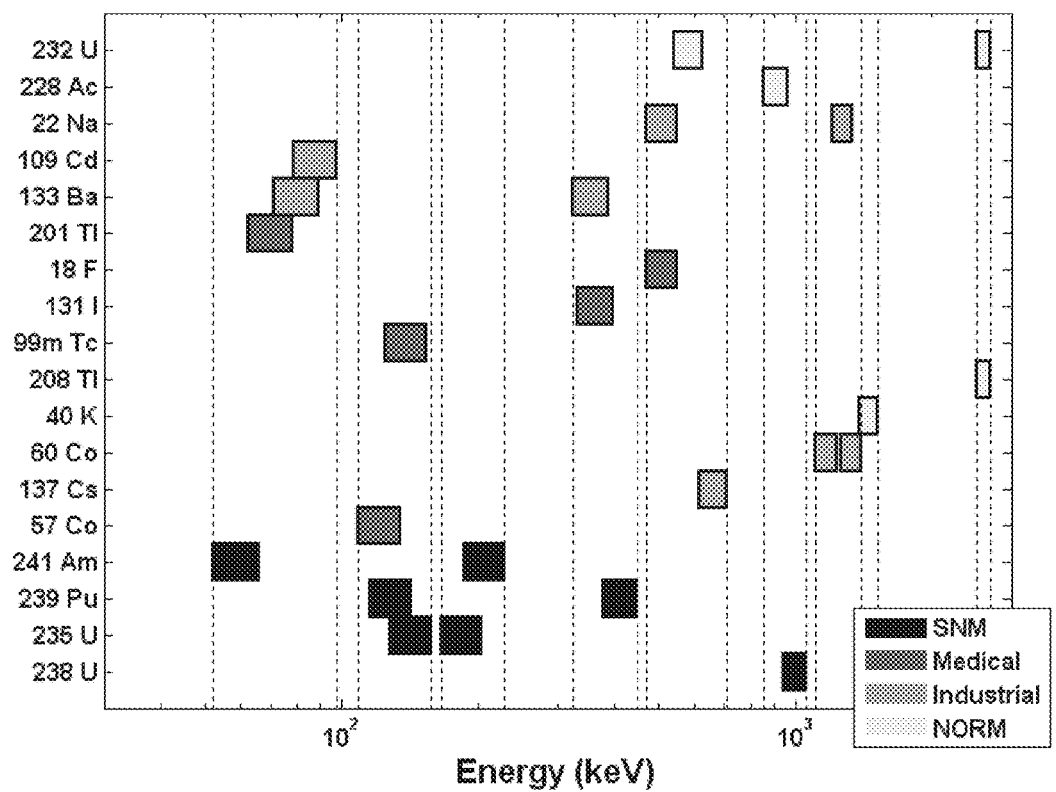
FIG. 5 shows the energy range from 30 to 3000 keV divided into final bins after a process of segmenting the energy range has been completed.
Figure 7:
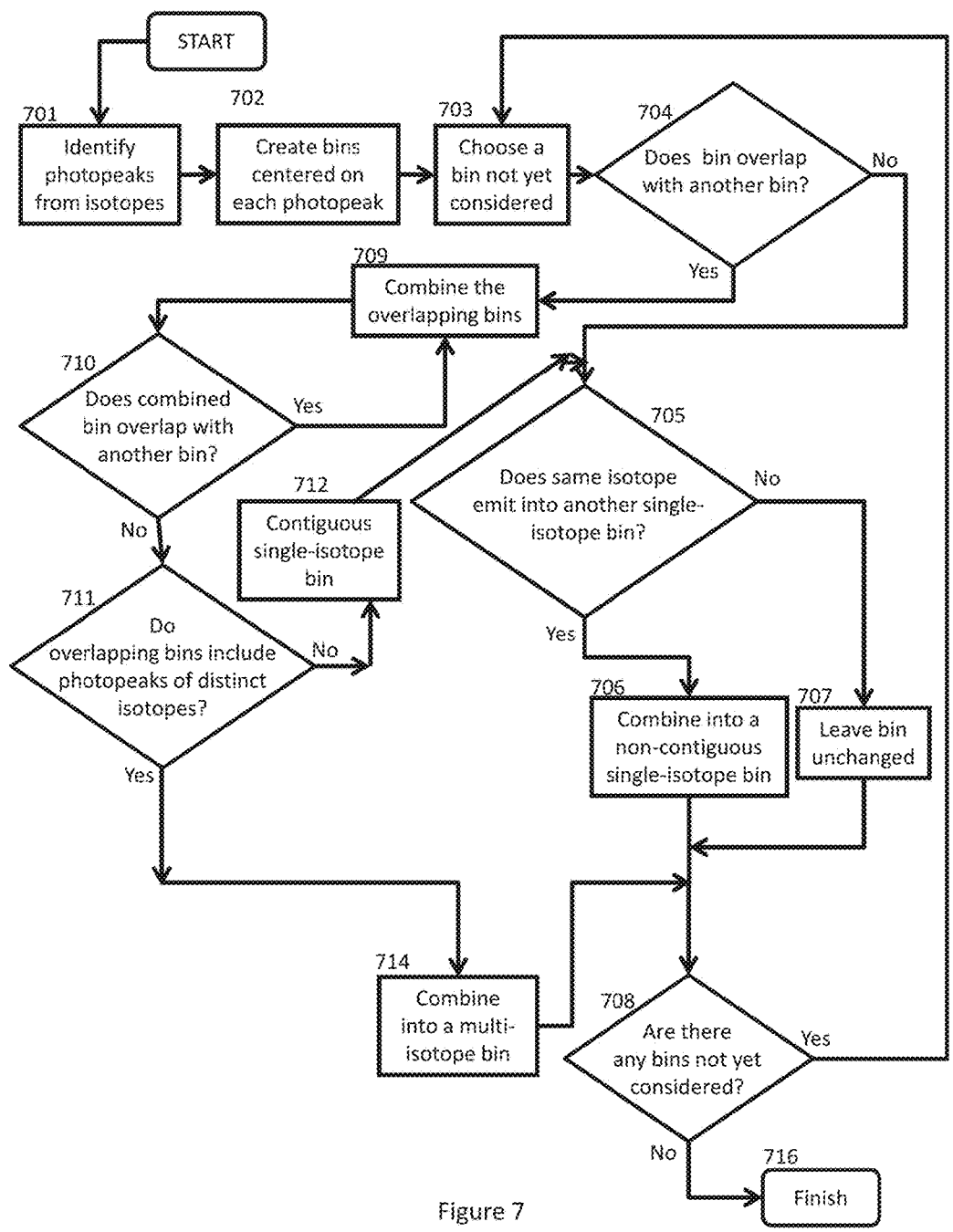
FIG. 7 shows a flowchart explaining a second particular way of segmenting a spectrum into bins.

The spectrum then can be segmented into bins by a multi-step process, for example as summarized in FIG. 3 or FIG. 7; results of one such exercise are illustrated in FIG. 5.

FIG. 3 shows a simpler method of combining bins, where any bins that overlap by a user-determined, adaptable amount are combined. The amount of overlap can be varied to provide either few bins each of which potentially contains more peaks, or more bins each of which contains fewer peaks. FIG. 7 describes a more complicated method, wherein the bin definition is handled as in FIG. 3, but in addition bins that are not contiguous can be combined if they contain photopeaks from the same isotope.

For many detectors the spectral lines are typically much narrower than the inherent detector energy resolution. (Note that the detector energy resolution is typically a function of energy.) In these cases, the width of a photopeak for binning purposes is determined principally by the energy resolution of the detector, rather than by the inherent width of the photopeak itself. But in either event the width of a photopeak for binning purposes can be defined in a variety of ways. For example, depending on the characteristics of the detector photopeak statistics, and the degree of overlap desired to be permitted, the width of the photopeak chosen could be the full width at half maximum (FWHM) as measured in the detector, the full width at some other multiple of the maximum, a calculated second moment, a calculated standard deviation, or an appropriate multiple of any of these values, or of another appropriate measure of width. Likewise, "overlap" can be defined in a variety of ways. For example, two photopeaks whose widths in the given detector have any energies at all in common could be said to overlap, or photopeaks could be said to overlap only where at least a particular fraction of their energies (such as, but not limited to, 10% or 25% or 50%) are in common. All of these measures of width and overlap are intended to be encompassed by this disclosure.

Referring to FIG. 3, after isotopes of interest are identified and their photopeaks are determined 301, tentative or provisional bins are created 302, one centered on each photopeak, with a width of each such provisional bin defined as described above based on the width of the photopeak as measured in the detector.

FIG. 2 illustrates such initial or provisional bins, for a particular detector. Each rectangle in that figure represents a spectral line (i.e., photopeak) for the indicated isotope, and one bin is associated with each such spectral line, with upper and lower bin boundaries accounting for both the width of the spectral line and the resolution of the detector being used.

FIG. 3 then illustrates one exemplary process that may be carried out to join these provisional bins into final bins to be used for the analysis. An initial provisional bin showing a photopeak may be chosen for analysis 303. If that provisional bin does not overlap with any other provisional bins 304, that non-overlapped bin is a single-isotope bin and is left unchanged 307 for the final set of bins. See for example the $^{40}$K line in FIG. 5. (If as discussed above a priori knowledge is being used to force one or more bins to be maintained by themselves, and the bin being analyzed is one such bin, that requirement can also be imposed at step 304.) In either event, if the "no" branch is selected at step 304, the process continues by determining if other bins remain to be considered 308, and if so choosing another bin for consideration 303.

On the other hand, if the first provisional bin is found at step 304 to overlap with a bin centered around another photopeak (and that other bin is not itself one singled out based on a priori information for individual treatment), then the overlapping bins may be combined into a single bin, larger than either of the two original provisional bins 309. See for example the $^{131}$I and $^{239}$Pu lines in FIG. 5. The $^{133}$Ba line also overlaps these lines and this process as described herein well also combine that bine with these two as it proceeds. This process of seeking other overlapping bins with this bin combination is continued until all bins which overlap in this cluster (and are not the subject of special treatment based on a priori knowledge) have been found and combined 309, 310. In continuing the process, however, it should be recognized that a decision must be made about whether the bin being tested for potential overlap should be compared with the initially-chosen bin for purposes of determining overlap, or with the latest bin added to the combination, or to the newly-combined bin (in which case a new width must be determined for the combined bin, following the principles set forth above). All such choices are intended to be encompassed by this disclosure.

Where a combined bin includes photopeaks from multiple distinct isotopes, some additional step will be needed at some point if it is desired to determine which of the multiple isotopes is responsible for the counts in that bin.

This ambiguity can sometimes be broken, for example, by noting that one of the multiple isotopes associated with that bin also emits into another bin where a detection has been made. For example, if a particular bin covering photopeaks of both $^{57}$Co and $^{239}$Pu registers a detection, then the system may look to another bin that covers a photopeak of $^{239}$Pu but not of $^{57}$Co to resolve the ambiguity and decide whether $^{57}$Co or $^{239}$Pu is the isotope being detected in the first bin. More complicated logical chains can result where a particular isotope emits into several multi-isotope bins. In that case, multi-isotope bins where no detection has been made can be used to rule out certain isotopes, thus helping to break the ambiguity of a detection in a multi-isotope bin. If no such ambiguity breaking is possible, it might be concluded that it was not necessary to determine by analytic methods which isotope of interest had been detected, and that the knowledge that some such isotope had been detected was sufficient for purposes of causing further investigation to be carried out.

The process of thus analyzing bins continues until it is found 308 that all provisional bins have been considered, and the process is finished 316.

Referring to FIG. 7 we now consider a more complicated method for aggregating bins, in which bins that are not contiguous in energy may nevertheless be combined if they are associated with the same isotope. After isotopes of interest are identified and their photopeaks are determined 701, tentative or provisional bins again are created 702, one centered on each photopeak, with widths as previously discussed. See FIG. 2. An initial provisional bin showing a photopeak may be chosen for analysis 703. As before, if that provisional bin does not overlap with any other provisional bins 704 (or is a bin chosen for special treatment based on a priori information), that non-overlapped bin is a single-isotope bin. At this point, additional steps are added as compared to the FIG. 3 method. Other bins already determined to be single-isotope bins are reviewed, and if the isotope for the newly-determined single-isotope bin is the same as the isotope for a previously-determined single-isotope bin 705, these bins may be combined to form a non-contiguous single-isotope bin to increase the counting rate for that isotope 706. However, if as is more likely the isotope for the single-isotope bin found is not the same as the isotope for any previously-determined single-isotope bins, then that bin may be left unchanged 707 for the final set of bins. See for example the $^{40}$K line in FIG. 5. In this scenario, the process continues as in the FIG. 3 method by next determining if other bins remain to be considered 708, and if so choosing another bin for consideration 703.

On the other hand, if the first provisional bin is found at step 704 to overlap with a bin centered around another photopeak (and that other bin is not itself one singled out based on a priori information for individual treatment), then the overlapping bins may be combined into a single bin, larger than either of the two original provisional bins 709.

See for example the $^{131}$I and $^{239}$Pu lines in FIG. 5. This process of seeking other overlapping bins with this bin combination is continued, as in the method of FIG. 3, until all bins which overlap in this cluster have been found and combined 709, 710.

At this point, additional steps are added as compared to the FIG. 3 method. If this final bin consisting of the cluster of overlapping combined provisional bins contains only photopeaks associated with the same particular isotope 711, then this bin may be treated as one single-isotope bin, in this case, contiguous 712. Here again, other bins already determined to be single-isotope bins may be reviewed, and if the isotope for the newly-determined single-isotope bin is the same as the isotope for a previously-determined single-isotope bin 705, these bins may be combined to increase the counting rate 706, and if other bins remain to be considered 708 the process may choose another bin for consideration 703.

More likely, a final bin consisting of multiple provisional bins will include photopeaks from distinct isotopes 711. Such a combined bin 714 that includes photopeaks from multiple distinct isotopes can be treated just like a single-isotope bin in the detection process below, and again the process continues by next determining if other bins remain to be considered 708, and if so choosing another bin for consideration 703.

However, in this circumstance where a combined bin includes photopeaks from multiple distinct isotopes, some additional step will be needed at some point if it is desired to determine which of the multiple isotopes is responsible for the counts in that bin. See the discussion above in connection with FIG. 3.

The process of thus analyzing bins continues until it is found 708 that all provisional bins have been considered, and the process is finished 716.

After the bins associated with photopeaks have all been combined to resolve overlaps, additional bins can be created centered on regions with no photopeaks. These NORM bins, together with bins encompassing photopeaks associated uniquely with NORM isotopes (e.g., $^{40}$K) will be used to estimate the background radiation level as discussed below.

It is important to note that the segmentation of the spectrum into bins described herein can result in (a) bins that are contiguous or non-contiguous, (b) bins that are equal to or larger than the local energy resolution, and (c) bins that cover one photopeak, multiple photopeaks of a single isotope, photopeaks associated with more than one isotope, or regions with no expected photopeaks.

This segmentation or binning procedure is dependent on the particular list of isotopes of interest and also on the resolution of the detector. Thus, when this segmentation and binning process is implemented across a collection of varying detectors, detectors which differ in their resolution may end up with different arrangements of bins. However, that does not preclude using the set of bins determined for one type of detector on the other.

FIG. 5 shows an example of a segmented spectrum divided into 12 bins. In this particular arrangement of bins, each energy is contained in one and only one bin, and while some of the bins may contain multiple overlapping photopeaks, others may contain no photopeaks. The bins from 229 keV to 324 keV, 708 keV to 835 keV and 1529 keV to 2518 keV which contain no peaks, or only peaks associated with NORM, are dedicated to detecting background radiation from NORM. Many of the bins include multiple photopeaks, including for example, the lowest energy bin, which includes peaks of $^{241}$Am, $^{201}$Tl, $^{133}$Ba, and $^{109}$Cd.

In the methods described above, it has thus far been assumed that bins are joined into a single bin if (taking into account their defined widths) they overlap by any amount at all. However, in alternative methods bins may be considered to overlap only if the degree of overlap exceeds a specified minimum, such as 10%. FIG. 5 shows an example where bins are joined if they overlap at all, and Table 2 provides the corresponding bin definitions (upper and lower bounds, and isotopes in each bin). Table 3, by contrast, lists the bin definitions of a process whereby bins were maintained as separate if no more than a small overlap (10%) existed. These two examples illustrate the trade-off between number of bins and number of isotopes potentially in those individual bins that result from altering the allowed overlap parameter.

Once a bin structure has been prepared as described above, it may be altered for computational or other reasons prior to beginning the particle filtering process or after that process has begun. For a given a system with finite computational resources, there may be an upper limit on the number of bins that is computationally feasible in the particle filtering process. And even if a number of bins is feasible, it may not be computationally optimal. For example, it might be possible to carry out the particle filtering process on a large number of bins, but only by doing so with a smaller number of particles, or with longer time intervals. In either case, it may be preferable to reduce the number of bins by combining or deleting bins after the systematic binning process described above and in the figures is complete.

Likewise, a prepared bin structure may be modified to focus on isotopes of special interest. The binning processes described above all start with an a priori list of isotopes of interest and then treat all isotopes of interest as being of equal importance. But it may be that within the list some isotopes are more important to the user than others. Ideally, the photopeaks associated with the most important isotopes would be located in bins that make those important isotopes the easiest to detect, e.g., single-isotope bins, or bins that include a minimal number of other photopeaks. After the binning process is complete, bins may be bifurcated, new bins may be added, or the bin structure may be otherwise altered to improve sensitivity of the system to isotopes of particular interest.

Finally, it should be noted that these bin determinations should not be considered static. Should a detection in one of the multiple-isotope bins occur it is possible to define new bins in that region via the processes described above to gain sensitivity in that energy region. Such dynamic reallocation of the energy bins is intended to be encompassed by this disclosure.

Once these bin structures have been prepared as explained above, the detector(s) may be used to monitor for radioactive sources; we next discuss how that may be done Scaled Background Determination Detection of a signal in a given bin at a given detector depends on an estimate of the background radiation present at the detector's location at the energy covered by the bin.

Figure 6:
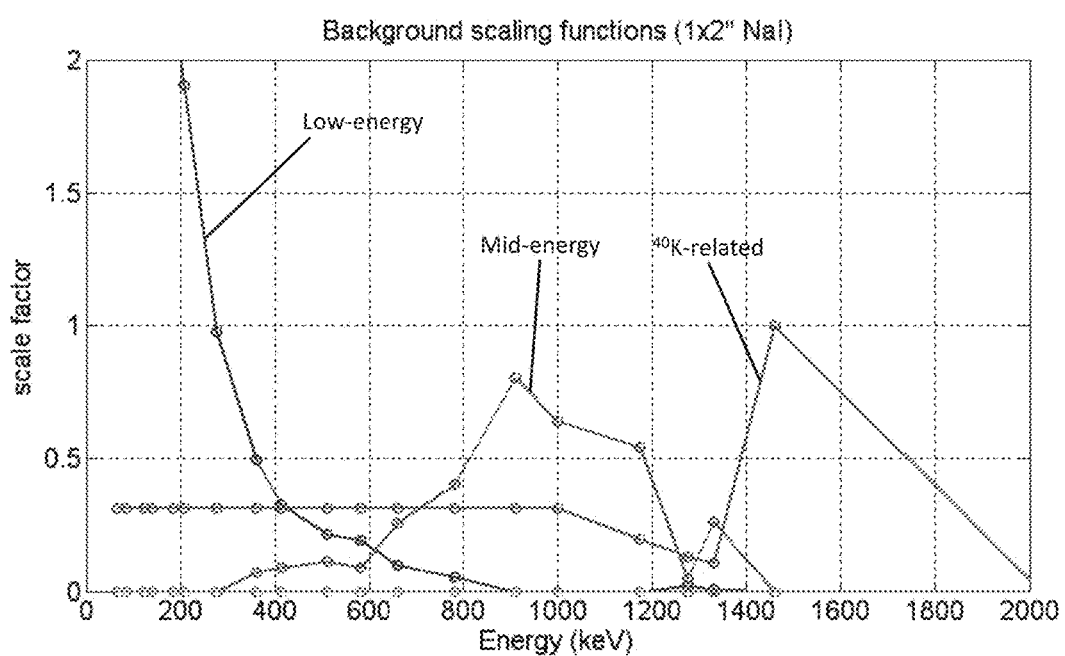
FIG. 6 shows three scaled background basis functions used for modeling NORM background levels.

In some embodiments, at any given geographical location, a continuous background spectrum can be modeled as a linear combination of basis functions, see, e.g., FIG. 6. These basis functions may be determined experimentally from data gathered from one or a variety of locations. It has been found convenient and effective to utilize three such basis functions, but the methods of this disclosure are not so limited and other basis functions, and numbers of basis functions, may be chosen. The number and nature of the basis functions may vary depending on the context. For example, the background count rate might be expected to be different, e.g. when operating on water, or at high altitude, or depending on the geological surroundings, and hence different background measurements, and different basis functions, may be used in such circumstances. If three basis functions are being used, the weight of each basis function may be determined by fitting the three component model to the count rate in NORM bins. The resulting linear combination of basis functions then provides an estimated background count rate in each bin that contains photopeaks from isotopes of interest, which can then be subtracted from the total counts in that bin, or be used as input to other methods, such as the particle filter method described below, to estimate the number of counts not associated with NORM, and thus representing a signal associated with the isotope of interest.

In some embodiments, such as shown in FIG. 6, one of the three basis functions may be composed of the $^{40}$K line and related continuum and other emissions. In some embodiments, the other basis functions may be related to decay chains for other naturally occurring radioactive isotopes (e.g. uranium or thorium), or may simply be determined from the background measured in various energy ranges (e.g., low and medium energy), as in FIG. 6. In the example shown in FIG. 6, the background is modeled using three basis functions, a low-energy component, a mid-energy component, and a $^{40}$K-related component that may include emission in, and scattering from, the $^{40}$K line. The error in the scaled background count rate in each bin may be estimated as the sum of the products of the errors in the linear coefficients times the magnitude of the basis functions in the given bin.

In some embodiments, some components of the scaled background model can be determined by forcing the model to match the count rate detected in a particular spectral line, for example, the 1461 keV photopeak of $^{40}$K, and/or to match a predetermined shape for a related spectrum.

In some embodiments the basis functions used to estimate the scaled background can be location specific in order to improve the estimation process. For example, the background over water is typically significantly different than on land and in that situation a different set of basis functions, or a different expected ratio of the functions may be appropriate.

Measurements of counts in NORM bins across one or more detectors can be collectively used in creating a map of past background measurements (i.e. a background map). (Note that in order to create a background map, it is necessary that the locations of the detector(s) are known, or estimated. In some cases, a detector may be located by conventional means, such as GPS, or by reference to fixed and known points sufficiently near the location of a detector, while in other cases the location of a detector may be determined as part of the particle-filtering process, either alone or in combination with location information derived from conventional means, as described in detail below.) The estimated background count rate at any given location in the map can be determined by combining the background estimates from one, some, or all of the detectors, typically weighted according to their proximity to the given location. Typically, data from detectors nearer the given location will be weighted more strongly that detectors farther from the given location, for example with a Gaussian weighting function centered on the given location. Data may also be weighted temporally, so that, for example, data acquired relatively recently can be weighted more heavily than older data, or data older than a certain cutoff may be discarded.

In one embodiment, independent background maps may be maintained; one consisting of combined measurements from all available detectors (i.e. the 'global background map'), and others consisting only of measurements from one particular local detector or closely-related group of detectors (i.e. 'local background maps'). This approach is useful for preventing errors in some detectors from propagating, through the global map, to other detectors. In this approach, if the background estimate from a particular local background map is consistent with the estimate from the global map for that location, then the global map estimate can be used for the local data analysis, and the local detector data may be considered valid for use in the global map. However, if the local estimate of the background is inconsistent with the global estimate, the system could trigger an error state causing, for example, analysis of the local data to be based on the local background map only, or triggering an alert to the possibility that a non-NORM isotope, that is not on the list of isotopes of interest, may have been detected. In some cases inconsistent background data is not sequestered, and is still used in generating the estimated global background map; in other cases, it could be disregarded in determining the global background map.

In some embodiments, the global background map is updated by including local data only if the particle filter (see below) does not detect any sources.

It will be evident that, in addition to determining if a single detector detects a background that differs from the estimated global background map, it may be appropriate to determine whether a discrete collection of detectors, such as those in a localized area, can or should be treated as having a background that is distinct from the global background, but consistent among members of that collection.

In all the cases described above, the background may be determined using a simple running average to incorporate recent previous background estimates and smooth out short term variations. The background determination may also involve cumulative running averages to similar effect.

"Particle" Filter

Figure 4:
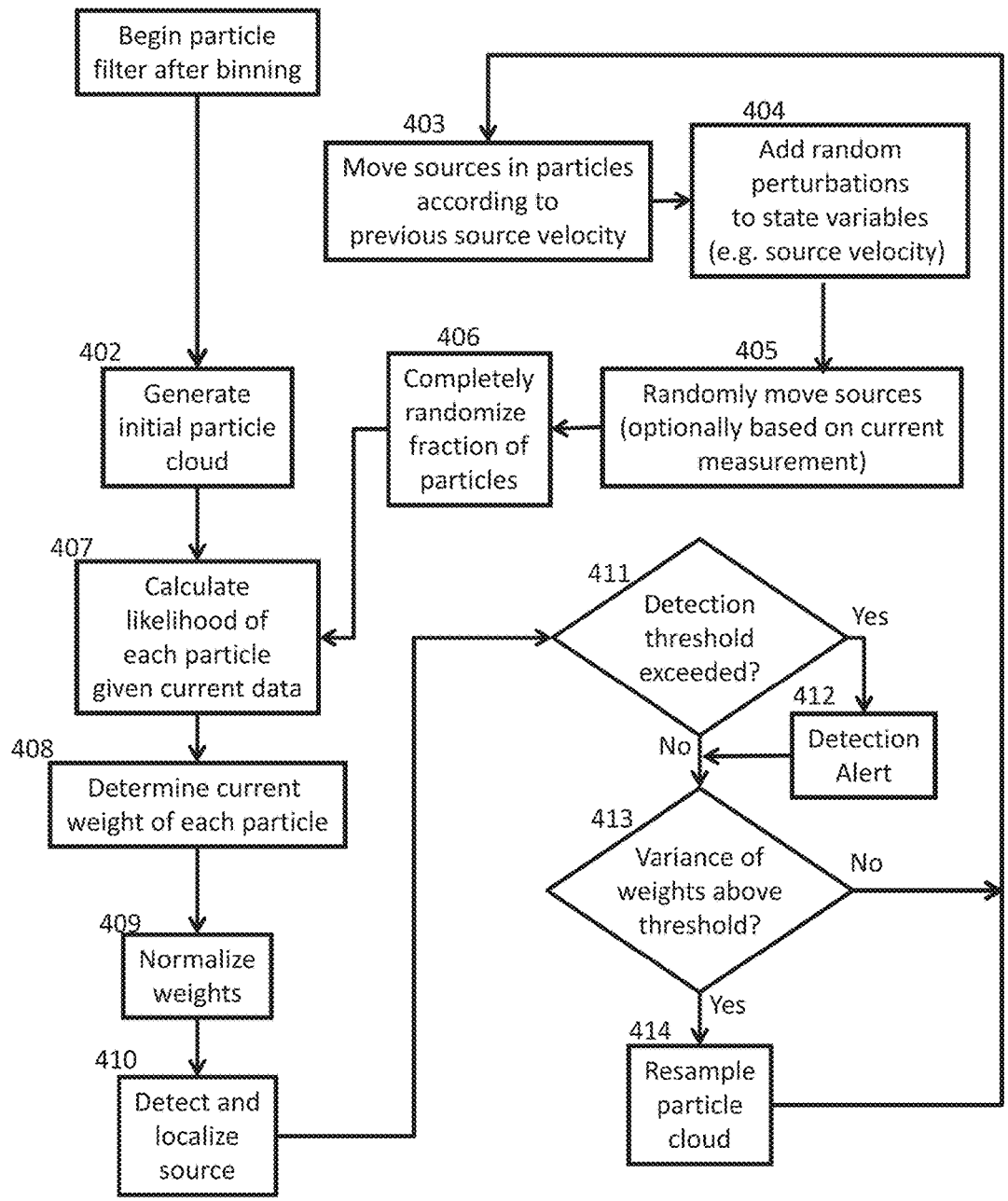
FIG. 4 shows a flowchart explaining one particular way of implementing a particle filter.

Once the background has been estimated, the source (and certain characteristics) of the detected radiation can be estimated by a process such as is described below and summarized in FIG. 4.

We consider now the process of analyzing data consisting of counts, during a measurement interval, in related bins of one or more detectors. (We refer to bins in different detectors as "related" if they cover at least one photopeak, and thus one isotope, in common.) This data hypothetically represents a single photopeak from a single isotope that has produced a signal above the background.

Measurement intervals do not need to be of equal length or uniformly spaced in time. Once data from a measurement interval has been acquired, the process outlined below may be carried out—in parallel or in series—for each group of related bins. The result may be the detection and/or localization of a single radioactive source at a single location, or the detection and/or localization of multiple sources, each responsible for the signal in a related group of bins.

Data collected from related bins in one or more detectors can be used to iteratively estimate the location, velocity and activity level (i.e., emission rate) of one or more radiation sources. It is important to note that the process of estimating location, velocity and activity level may make no reference to the identity of the isotope in question if the detection is in a bin or bins containing photopeaks of more than one isotope. It has been found to be computationally more efficient to work independently on different bins, and then identify individual isotopes only after the source properties have been estimated on a bin-by-bin basis.

The process used to estimate location, velocity and activity level of a source is called "particle filtering." The particle filtering process involves comparing a "cloud" of multiple hypothetical states, called "particles," with the data. A state vector is defined for each particle, defining a hypothetical source's location, velocity and activity level (and, as discussed more fully below, optionally including additional variables as well). The process of particle filtering updates each hypothetical particle's state vector at each time step using newly acquired data while incorporating the prior history of the particle.

Although the location, velocity, and activity level of the source are typically of primary interest, the ability to detect and localize sources may be aided by optionally including other variables in the state vectors of particles. These other variables may include (but are not limited to) location and velocity of one, some, or all detectors, the background rate in each detector and each bin, and the efficiency of each detector in each bin. (All of these variables may contribute to the calculation of the expected count rate in a given bin and detector.) If they are included in the state vector as variables, the process of particle filtering will yield not just the probable location of the radioactive source(s), but also, e.g., the location and efficiency of the detector(s). Any of these other variables can instead be treated as a priori parameters that are inputs to the particle filter process rather than determined in the particle filter process. If considered as parameters, quantities may still be varied over time based on considerations external to the particle filter process.

In some embodiments, some quantities which have uncertainty associated with them may be best represented in the state vector by sets of probability distributions, or "proposal distributions," rather than by specific concrete values. In these cases, the parameters of the proposal distributions may be included in the state vector in place of the actual quantity. Examples of this usage may include (but are not limited to) modeling the source location or activity level with gamma distributions each having an independent shape and scale parameter. If this option is utilized, when concrete particle values for these parameters are required they may be obtained by drawing random samples from the distribution using the current parameter values in the state vector. Additionally, optionally more than one random sample may be drawn, and the results of multiple drawings may be used to estimate both the value of the underlying variable and its uncertainty. Additionally, when elements of the state vector are obtained from proposal distributions, the shapes of the distributions can be used to estimate uncertainties.

Generally multiple detectors will be involved (although the term "network of detectors" as used herein is intended to encompass embodiments in which a single detector is in communication with the rest of the system). If the detectors have differing energy resolutions, as discussed above, their bin structures may differ. Nevertheless, it may be useful where a particular bin in one detector is found to have a signal above the estimated background, or sufficiently above the estimated background to exceed a trigger level, (i.e., is a "hot" bin) to use data from bins in other detectors with energy ranges that overlap that of the particular "hot" bin to carry out the particle filtering and estimate the relative location, velocity and activity level of the radiation source. (As discussed above, these bins are referred to as related bins.) In yet other embodiments, the particle filtering may be done for a set of related bins even though no single bin has a signal definitively above the expected background, in the event that aggregating data from related bins yields an overall significant result.

As set forth above, in situations where the location, velocity and perhaps sensitivity of the multiple detectors are not known, or not accurately known, these quantities can be treated as variables in state vectors, and can be determined iteratively along with the location, velocity and activity level of the source(s). Alternatively, however, the locations and velocities of detectors can be determined by conventional means, such as GPS, that are not part of the particle filtering process.

A particle filtering process of the type disclosed herein may be generally described as including four steps. Before discussing the steps in detail, we present an overview of the overall process.

(1) The first step is to propose new particle states (i.e., new values for the state vector corresponding to each hypothesis). As the process is run, in each cycle these particle states are based on the particle cloud from the previous cycle, and on the most recent measurements, with a randomized modification (discussed in more detail below) to determine an updated state vector for each particle in the cloud at the current time. In addition, as also discussed further below, a small minority of particle state vectors may be completely randomized in each new cycle. It should be recognized that, since the radiation sources (and the detectors) may be moving in the general case, the predicted new states for the new cycle may be different from the prior states, even putting aside any randomized modification, reflecting the movement of the sources (and in some cases the detectors) in the time that has elapsed since the prior set of measurements. In addition, as the process is repeated, each state vector (representing a possible radiation source and, optionally, other parameters such as detector locations and sensitivities) has a weight associated with it (representing the probability of the particle's state values relative to all others). However, the first time the process is run, an initial particle cloud must be determined. This may be done in a variety of ways, including using randomization techniques. One example of how to determine the initial cloud will be discussed in detail below.

(2) Given the proposed new particle states determined by the state vectors generated in the prior step, the second step is to compute a new weight (or probability) for each particle state based on the previous weight and the likelihood of the current particle given the current detector measurements. As discussed more fully below, this weight reflects, generally, the likelihood of that particle's current state values, given the relevant data.

(3) Given the new weights generated in the prior step, the third step is to compute expected values and uncertainties for each source by computing weighted averages over all particles in the cloud, essentially determining a weighted average source position over the entire ensemble of particles, and similarly determining a weighted average source activity level. At this stage, the system may "detect" a source if a predetermined threshold is surpassed. Again, more detail is presented below.

(4) Finally, given the new weights generated in the second step, as discussed below the fourth step is to "resample" the particles by creating additional copies of high-weight (high-likelihood) particles and deleting low-weight (low-likelihood) particles if and when the variance of the weights in the particle cloud passes a threshold. After possible resampling (or no resampling if the variance of the weights is small) the process is repeated starting with the first step.

We now discuss the four steps of the process in more detail.

The first step in the iterative process is to generate a particle cloud to represent an ensemble of hypothetical radioactive source locations, velocities and activity levels, and in some cases, detector locations, velocities, sensitivities, etc., as of the current time step.

If this is the first cycle in the process, then an initial cloud must be generated in order to initially populate the phase space with multiple hypothetical state vectors, i.e., particles 402. As explained above, each particle has a state vector including a radioactive source position, velocity and activity level, as well as (optionally) other parameters.

The total number of particles is set so that a single complete round of all four steps will typically require computation time less than or equal to the time over which data is collected by the detectors for each cycle. The data collection time in turn is typically set by external considerations, such as the expected speed at which detectors and potential sources may be moving, and expected or actual counting rates. Data collection times can range, for example, from 0.1 seconds to 60 seconds, and in some cases may be shorter or longer, but in many typical situations, where detectors and sources are expected to be moving by foot, a one second time will be appropriate.

To populate the initial cloud, an equal number of particles may be assigned to each detector, or to each detector which has reported a signal above expected background. The state vectors may then be randomly determined. For example, the radial position of the radioactive source in each particle relative to its assigned detector can be randomly drawn from a probability distribution whose shape is influenced by the estimated background rate and total count rate in that detector. The direction from the detector to the radioactive source in the particle may be randomly drawn from a spherical uniform distribution, or may be non-uniformly focused on a particular elevation, such as ground level, or a particular azimuthal direction, or may be constrained not to go below a specific level, e.g., ground level. The activity level of the source may be randomly drawn from a uniform distribution. The initial source velocities may also be uniformly random, or may be initialized to zero. The activity levels of sources, and/or the number of particles assigned to a detector, can be varied based on the extent by which the counts in that detector in the bin being analyzed exceed the expected background level.

If this is not the first iteration of the process, then new particle states are generated from the old particle states in four stages.

First, each old particle's source location is updated by multiplying its previous source velocity by the time interval since the last update and adding the resulting movement to the previous source location 403. This assumes no source acceleration between steps. (If detector parameters are included in the state vectors, detector locations may be updated in the analogous manner.)

Second, each particle's source velocity is modified by adding a randomly generated perturbation to the source velocity in the state vector 404. Particle velocity can be randomized in all three dimensions, or, as with locations, constraints such as requiring that the source not go below ground level may be applied. (Again, if detector parameters are included in the state vectors, detector velocities may be updated in the analogous manner.)

These changes (403 and 404) are collectively referred to as the 'dynamic update' because they account for changes associated with the source movement over time.

Following this dynamic update, particles may be further modified by applying a randomization and this further modification optionally may use the current detector measurements to constrain the range of possible state vector values (405). For example, the particle's source radial distance from a particular detector, e.g., the nearest detector, may be randomly changed from the dynamically updated location using a probability distribution similar to the one used in populating the initial particle cloud. The direction from the nearest detector to the source can also be randomized, but unlike in the initial cloud, the permitted distribution is typically not uniform, but rather is peaked and centered upon the previous direction. The source activity level likewise can be randomized, but, again, typically by starting from the current activity level. These randomizations thus take into account the fact that the process has already been running, and the current estimates are, if not the optimal values of direction and activity level, likely to be a better estimate of true direction and activity level than a variable drawn from a uniform random distribution. The additional randomization therefore allows for the refinement of the state vector values. In each of the above examples, the parameters of the distribution used to draw random samples may be influenced by the current measurement, in addition to the values in the prior state vector and the dynamically updated values. (Again, if detector parameters are included in the state vectors, such detector parameters may be randomized in the analogous manner.)

Fourth, a fraction of all current particles can be completely randomized 406, as if they were part of an initial distribution. This fraction may be calibrated for performance. The fraction may be, for example, in the range from 0% to 50%, in particular 10%, or lower or higher. Thus, in the process described in FIG. 4, 402, or 403 to 406 constitute the first step.

The second step is computing a weight for each hypothetical particle in the updated cloud. In each iteration, each such particle is assigned a weight based on the particle's likelihood in light of the newly acquired data, and preferably but not necessarily also based on its previous weight. This is a point in the particle filtering process where new measurements are used to further constrain the model.

To calculate the likelihood of a given particle 407, the expected count rate for the source in that particle as seen by each detector is calculated for the relevant energy bin which contains the photopeak associated with the source in the particle. In this calculation, if detector parameter values are included in the state vectors each particle's source count rate for each detector is calculated based on the detector parameters in the particle. If the detectors are not isotropic, the angle of incidence of the particle on the detector must be taken into account. In some embodiments, state vectors may include the possibility of multiple sources with potentially different locations, velocities and activity levels. In that case, the multiple sources may all contribute to the calculated count rates. To this estimated signal in any given detector, predicted based on the state vector of the particle, is added an expected number of background counts in the detector (which also will depend on the state vector if the state vector includes detector parameters). Then the actual number of counts associated with the detector's bin is compared to the predicted number, and, making an assumption about the probability distribution of the counts from the source in question, the probability that the particle in question would generate the observed number of counts in the given detector is calculated. A Poisson distribution may be used as the assumed probability distribution. Such a probability is then generated for that particle using the measurements from each detector, and all the resulting probabilities are multiplied together, to arrive at an overall probability or likelihood 407.

Next, based on the likelihood for a particle, a new weight is determined for that particle 408. The new weight may simply be the result of comparing the likelihood for that particle to the sum of likelihoods of all particles in the cloud, or it may optionally also be based in part upon the previous weight of that particle in order to include the particle's history in its current probability and to smooth out changes in weight of each particle over time. In this way, a particle with a previously high weight will not, based on a single time step in which the particle is calculated to have low probability, suddenly be assigned a very low weight. Once the process has been carried out for all particles, the weights are normalized to sum to one 409, allowing the weights to be treated as probabilities. Thus, in the process described in FIG. 4, 407 to 409 constitute the second step.

Once new weights have been determined, one or more sources may be detected and localized, with associated uncertainties recognized. 410. In one embodiment, to locate a single source, the activity and position of the sources in all particles in the cloud as weighted by their likelihoods (weights) may be summed. (Optionally, if new completely-randomized particles were added at step 406, those particles could be omitted from the calculation, in that they do not yet carry any history that would make them predictive of any actual source location.) The weighted average position of particles in the cloud is the best estimate of a single source responsible for the data from the current time step. The error in source position may be estimated by the weighted standard deviation (or other statistical measure of variation) calculated over the particles in the cloud.

At this stage the system may be set to trigger an alarm condition 411 corresponding to an affirmative detection of a source 412. The condition may be triggered, in a number of different ways, for example, if the error in the position of a source drops below a predetermined level, indicating that a source has been localized, and/or if the total detected activity level exceeds a predetermined value, indicating a sufficient likelihood that a radioactive source is present. In practice, any triggering threshold will be chosen so as to acceptably balance the possibility of false positives with the amount of data collection necessary to positively identify a source. Thus, in the process described in FIGS. 4, 410 to 412 constitute the third step.

Finally, the particles may be resampled in a fourth step. If the variance in particle weights is high, surpassing a predetermined threshold 413, then it may make sense to drop the low-probability particles out of the model and replace them with other possible high-probability particles that can meaningfully take part in the iterative algorithm. Particles may be drawn with replacement at random based on the likelihood of each existing particle, resulting in a new particle cloud more heavily populated by high-likelihood particles 414. The total number of particles may be conserved. Resampling is not necessarily performed on every iteration, but may be limited to times when the particle cloud seems to be stratifying into high- and low-likelihood constituencies. After this resampling step, the weights for each new particle are reset such that all new particle weights are equal and, the full ensemble of weights including old and new particles sums to one. In the process described in FIGS. 4, 413 and 414 constitute the fourth step.

After detection and localization, and possible resampling, the process is repeated using the new data collected for the next cycle by returning to step 403.

Of course, if an alarm condition is triggered, other steps beyond the scope of this disclosure may be taken to respond to the suspected presence of one or more isotopes of interest. For example, security authorities or personnel associated with the detectors may be notified of a suspicious or threatening situation, and required to take further steps. In this respect, it should be recognized that threshold levels for triggering alarms may be set to reflect a desired ratio of false positives as compared to the chance of a false negative (i.e., a failure to detect). In such an analysis, the ratio might be varied depending on a priori knowledge or estimates of a true threat level, optionally using Bayesian techniques.

Directional Information from Non-Directional Detectors

Radiation detectors may provide location and velocity information by way of GPS or other absolute measurements of position and/or orientation. As an alternative, radiation detectors can be equipped with inertial measurement units (IMUs) in the form of microelectromechanical (MEMs) devices. IMUs can measure acceleration, both translational and rotational, which can be integrated to yield velocity, spin, position, and angular orientation information relative to given initial conditions. Because IMUs determine velocity, spin, position, and angular orientation by integration, and therefore cannot independently determine the constant of integration, IMUs cannot be used to determine absolute velocity, position, spin, or angular orientation.

Typical radiation detectors provide non-directional data on radiation levels. But by moving, either in translation or rotation, the user can effectively create directional data, as long as the detector has some way of tracking its position and orientation relative to objects that locally effect the propagation of radiation. For example, the amount of radiation detected by a non-directional sensor can be recorded as a function of position (using GPS information) as the sensor translates. By mapping out the shape of a gradient in the amount of radiation, the system may be able to infer a source location. Similarly, the amount of radiation detected by a non-directional sensor can be recorded as a function of angular orientation as the user rotates in place. Suppose a portion of the detected radiation originates at a point source. At some point in a full rotation, the user's body will be directly between the detector and the point source, attenuating the radiation from the source. Even when a user is not carrying out such a purposeful rotational survey, it can be important to use information to track position and orientation of the device, so that the effect of body-shielding of radiation sources can be taken into account.

Figure 8A:
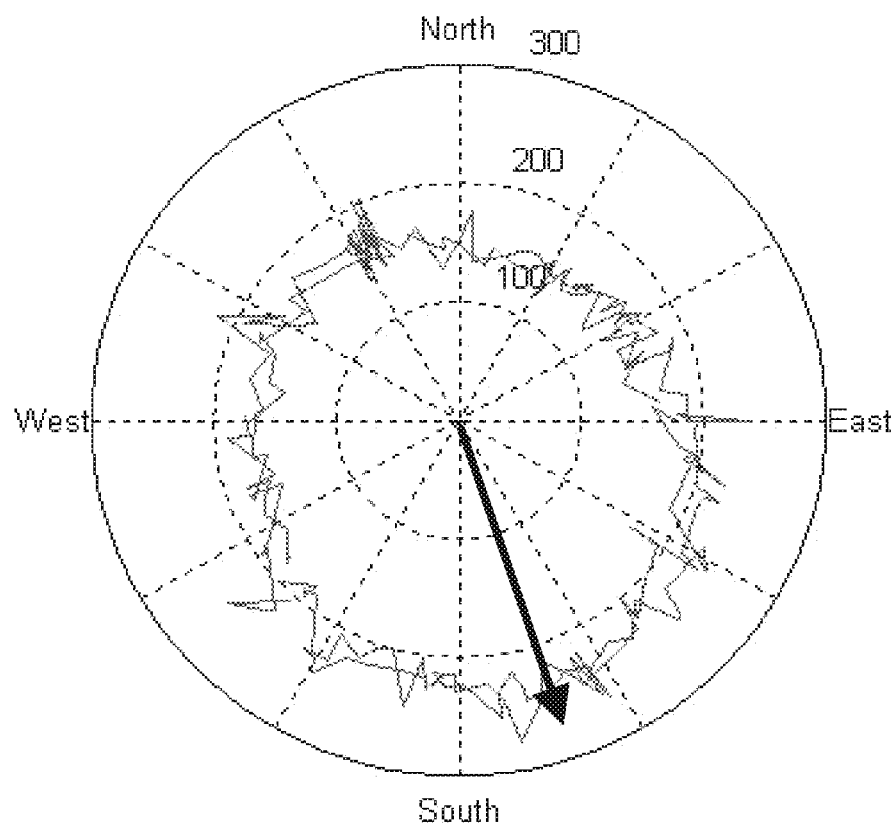
FIGS. 8A & 8B show directional data collected from a networked sensor.
Figure 8B:
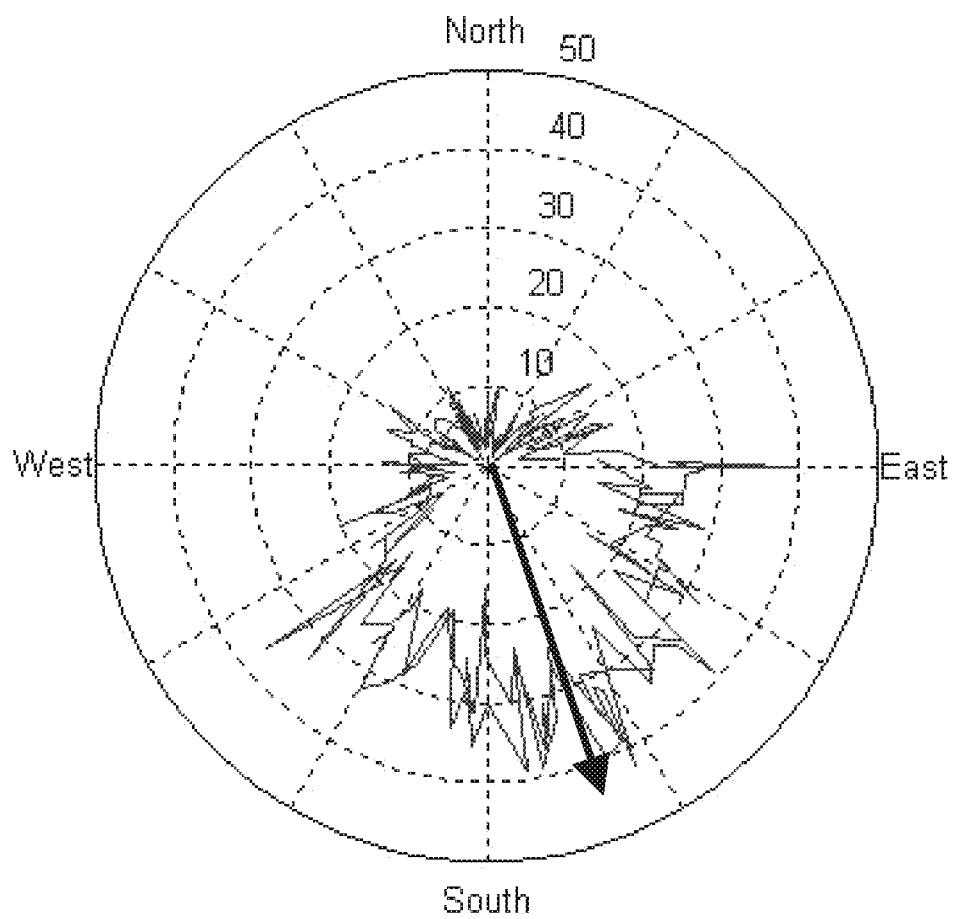

The spectral binning processes described above can be advantageously combined with rotational surveys and other methods of obtaining directional information. FIGS. 8A and 8B show the angular variation in count rate based on a rotational survey carried out near a $^{137}$Cs source. FIG. 8A includes data integrated across a wide spectrum of energies, 60 to 3000 keV. FIG. 8B includes data from the same rotational survey, limited to date in a narrow bin around the 662 keV photopeak of $^{137}$Cs. When integrating across the entire spectrum, a great deal of background radiation is detected, much of it isotropic, while in the narrow bin, most of the radiation comes from the $^{137}$Cs photopeak showing strong directionality because it originates mainly or entirely from a single point source.

Translational motion by a user (e.g., walking around) can also help localize a radiation source. By geographically exploring the radiation field generally, and in particular its gradient, a user can provide important information regarding the location of radiation sources. For example, if a single point source dominates the emission into a particular spectral bin, the count rate due to that source will be inversely proportional to the square of the distance from the source to the detector. By mapping out the shape of that $1/r^2$ field, information about the location of a source can be inferred.

A sensor device that is capable of detecting directional information, as by use of an IMU or GPS unit for example, may also be equipped to display direction information to a user. This can be used to provide directions to the user. During each integration interval, the system may be determining a best estimate for the location or locations of one or more radiation sources. Given a sensor device's location and velocity, the system can then direct a user to explore a certain area. For example, the user might be directed to walk toward (or away from) the suspected location of a radiation source. The directions could be based on an actual detection of a radiation source, for example from a particle filtering process as described above. Or the direction could be based merely on the current best estimate of what areas look most promising for a detection. Alternatively, directions could be given to explore an area where data is currently lacking, even in the absence of a detection.

FIGS. 9A-D show a simulated example of such a guided search process by showing at four different times in the search process the detector location 901, the true source location 902, and the current best estimate of the source location 903. Each time step also shows as small white dots and ensemble of possible source locations. In this scenario, the true source location 902 does not change because the source is not moving. In FIG. 9A, the sensor 901 is at the center of the search area having not yet moved, the true source location 902 is in the corner, and the current best estimate of the source location is also near the center since it is based only on the fully randomized ensemble of possible source locations, none of which have yet been improved by the particle filtering process. In FIG. 9B, data has begun to accumulate, gradually improving best estimate of the true source location 903. But because the estimate has not improved much, the user carrying the detector 901 has not yet been directed to move very far from the center of the field. In FIG. 9C, the quality of the best estimate 903 has improved, as can be seen from the clustering of the ensemble of particles. The directions now take the detector 901 significantly away from the center of the field. In FIG. 9D, the source has been detected and the user has been directed to the source location, with the result that the detector 901, the true source location 902 and the best estimate of the source location 903 are almost perfectly on top of one another in the figure.

EXAMPLES

Methods of detecting a radiation source can make use of: a network of at least one detector, each detector being capable of detecting photons in a predetermined energy range; and a computer including: a processor; an input device; an output device; and a memory, the memory including a predetermined list of a plurality of photopeaks, the list including for each photopeak an associated central energy, an associated energy width, and an associated isotope from which the photopeak originates; the computer being capable of receiving by the input device and storing in the memory data collected at each of the detectors. Such methods can include a series of numbered steps such as (1) defining a plurality of energy bins within the predetermined energy range, such that each of the plurality of photopeaks on the predetermined list is associated with exactly one energy bin, and at least one energy bin is associated with an energy range within the predetermined energy range with which no photopeak on the predetermined list is associated. An energy bin associated with an energy range with which no photopeak on the predetermined list is associated is referred to as a background spectral bin and an energy bin with which at least one photopeak on the predetermined list is associated is referred to as a signal spectral bin. The method can also include: (2) collecting, in the memory, from the network of at least one detector, during a predetermined time interval, background data associated with energies lying within the one or more background spectral bins; (3) collecting, in the memory, from the network of at least one detector, during the predetermined time interval, signal data associated with energies lying within at least one signal spectral bin; (4) combining, in the processor, at least collected background data from at least one background spectral bin and collected signal data from at least one signal spectral bin, thereby determining whether at least one radiation source has been detected in at least one signal spectral bin in the predetermined time interval; and (5) if at least one radiation source has been detected in at least one signal spectral bin in the predetermined time interval, outputting through the output device an indication that at least one radiation source has been detected.

In some embodiments, such methods can include, in step (1), parts (A), (B), (C) and (D), as follows:

(A) choosing a not-yet-chosen photopeak from the predetermined list;

(B) if the chosen photopeak does not overlap with a defined signal spectral bin, then defining a new signal spectral bin having: (i) an associated signal spectral bin central energy equal to the central energy associated with the chosen photopeak; and (ii) an associated signal spectral bin energy width equal to the energy width associated with the chosen photopeak; and (C) if the chosen photopeak overlaps with at least one defined signal spectral bin then defining a new signal spectral bin to replace the at least one defined signal spectral bin which the chosen photopeak overlaps, the new signal spectral bin having (i) an associated signal spectral bin central energy based on a combination of the central energies associated with the defined signal spectral bins which the chosen photopeak overlaps, and the central energy associated with the chosen photopeak, and (ii) a new signal spectral bin energy width based on a combination of the energy widths associated with the defined signal spectral bins which the chosen photopeak overlaps, and the energy width associated with the chosen photopeak; and (D) repeating steps (A) through (C) until each photopeak on the predetermined list has been chosen.

In other embodiments, such methods can include, in step (1), parts (A), (B), (C) and (D), as follows:

(A) choosing a not-yet-chosen photopeak from the predetermined list;

(B) if the chosen photopeak does not overlap with a defined signal spectral bin; then:

(i) if the chosen photopeak does not overlap with any not-yet-chosen photopeak, defining a new signal spectral bin having: (a) an associated signal spectral bin central energy equal to the central energy associated with the chosen photopeak; and (b) an associated signal spectral bin energy width equal to the energy width associated with the chosen photopeak; and then (ii) if the chosen photopeak overlaps with one or more not-yet-chosen photopeaks, determining whether any of the overlapping not-yet-chosen photopeaks overlaps with at least one defined signal spectral bin, and (a) if none of the overlapping not-yet-chosen photopeaks overlaps with a defined signal spectral bin, defining a new signal spectral bin having (I) an associated signal spectral bin central energy based on a combination of the central energies associated with the chosen photopeak and the one or more not-yet-chosen photopeaks overlapping the chosen photopeak, and (II) an associated signal spectral bin energy width based on a combination of the energy widths associated with the chosen photopeak and the one or more not-yet-chosen photopeaks overlapping the chosen photopeak, and classifying the not-yet-chosen photopeaks overlapping the chosen photopeak as chosen; and (b) if at least one of the overlapping not-yet-chosen photopeaks overlaps with at least one defined signal spectral bin, defining a new signal spectral bin, to replace the at least one overlapping defined signal spectral bin, the new signal spectral bin having (I) an associated signal spectral bin central energy based on a combination of the central energies associated with the chosen photopeak, the one or more not-yet-chosen photopeaks overlapping the chosen photopeak, and the at least one overlapping defined signal spectral bin; and (II) an associated signal spectral bin energy width based on a combination of the energy widths associated with the chosen photopeak, the one or more not-yet-chosen photopeaks overlapping the chosen photopeak, and the at least one overlapping defined signal spectral bin; and classifying the not-yet-chosen photopeaks overlapping the chosen photopeak as chosen; and (C) if the chosen photopeak overlaps with at least one defined signal spectral bin (i) then if the chosen photopeak does not overlap with any not-yet-chosen photopeak, defining a new signal spectral bin, to replace the at least one defined signal spectral bin which the chosen photopeak overlaps, the new signal spectral bin having (a) an associated signal spectral bin central energy based on a combination of the central energies associated with the defined signal spectral bins which the chosen photopeak overlaps, and the central energy associated with the chosen photopeak, and (b) a new signal spectral bin energy width based on a combination of the energy widths associated with the defined signal spectral bins which the chosen photopeak overlaps, and the energy width associated with the chosen photopeak; and (ii) then if the chosen photopeak overlaps with one or more not-yet-chosen photopeaks, determining whether any of the overlapping not-yet-chosen photopeaks overlaps with at least one defined signal spectral bin in addition to the defined signal spectral bins which the chosen photopeak overlaps, and (a) if none of the overlapping not-yet-chosen photopeaks overlaps with a defined signal spectral bin in addition to the defined signal spectral bins which the chosen photopeak overlaps, defining a new signal spectral bin, to replace the at least one defined signal spectral bin which the chosen photopeak overlaps, having (I) an associated signal spectral bin central energy based on a combination of the central energies associated with the defined signal spectral bins which the chosen photopeak overlaps, and the central energies associated with the chosen photopeak and with the one or more not-yet-chosen photopeaks overlapping the chosen photopeak, and (II) an associated signal spectral bin energy width based on a combination of the energy widths associated with the defined signal spectral bins which the chosen photopeak overlaps, and the energy widths associated with the chosen photopeak and with the one or more not-yet-chosen photopeaks overlapping the chosen photopeak; and classifying the not-yet-chosen photopeaks overlapping the chosen photopeak as chosen; and (b) if at least one of the overlapping not-yet-chosen photopeaks overlaps with at least one defined signal spectral bin in addition to the defined signal spectral bins which the chosen photopeak overlaps, defining a new signal spectral bin, to replace the at least one overlapping defined signal spectral bin, the new signal spectral bin having (I) an associated signal spectral bin central energy based on a combination of the central energies associated with the chosen photopeak, the one or more not-yet-chosen photopeaks overlapping the chosen photopeak, and the at least one overlapping defined signal spectral bin; and (II) an associated signal spectral bin energy width based on a combination of the energy widths associated with the chosen photopeak, the one or more not-yet-chosen photopeaks overlapping the chosen photopeak, and the at least one overlapping defined signal spectral bin; and classifying the not-yet-chosen photopeaks overlapping the chosen photopeak as chosen; and (D) repeating steps (A) through (C) until each photopeak on the predetermined list has been chosen.

In other embodiments, such methods can include, in step (1), parts (A), (B), (C), (D) and (E), as follows:

(A) for each photopeak on the predetermined list, defining a signal spectral bin having an upper bound and a lower bound based on the central energy and energy width associated with the chosen photopeak;

(B) ordering the signal spectral bins from lowest lower bound to highest lower bound;

(C) choosing a signal spectral bin that has a lowest lower bound of all non-yet chosen signal spectral bins;

(D) if the chosen signal spectral bin overlaps with any other signal spectral bins: (i) redefining the chosen signal spectral bin to have a lower bound equal to the lower bound of the chosen spectral bin and an upper bound equal to the highest upper bound of all the signal spectral bins that overlap the chosen bin; (ii) deleting the signal spectral bins that overlap the chosen bin; (iii) repeating step (D) based on the redefined chosen signal spectral bin; and (E) repeating steps (C) and (D) until all signal spectral bins have been chosen.

In other embodiments, such methods can include, in step (1), parts (A), (B), (C), (D) and (E), as follows:

(A) for each photopeak on the predetermined list, defining a signal spectral bin having: (i) an associated signal spectral bin central energy equal to the central energy associated with the chosen photopeak; and (ii) an associated signal spectral bin energy width equal to the energy width associated with the chosen photopeak;

(B) choosing a not-yet-chosen defined signal spectral bin;

(C) if the chosen defined signal spectral bin does not overlap with another defined signal spectral bin, then leaving the chosen defined signal spectral bin unchanged;

(D) if the chosen defined signal spectral bin does overlap with one or more other defined signal spectral bins then replacing both the chosen signal spectral bin and the overlapping other defined signal spectral bins with a new defined signal spectral bin having: (i) an associated signal spectral bin central energy based on a combination of the central energies associated with the chosen defined signal spectral bin and the one or more overlapping defined signal spectral bins; and (ii) an associated signal spectral bin energy width based on a combination of the energy widths associated with the chosen defined signal spectral bin and the one or more overlapping other defined signal spectral bins; and classifying the new defined signal spectral bin as chosen; and (E) repeating steps (B) through (D) until each signal spectral bin on the predetermined list has been chosen.

Such methods can also include, if a plurality of signal spectral bins exists, that are associated only with a set of photopeaks all of which originate from a same single isotope, then replacing the plurality of signal spectral bins with a single non-contiguous signal spectral bin associated with all of the set of photopeaks.

In some such methods the associated energy width for a photopeak on the predetermined list is the full width at a predetermined fraction of the maximum of the spectrum of the photopeak.

In some such methods the associated energy width for a photopeak on the predetermined list is the calculated second moment of the spectrum of the photopeak.

In some such methods a photopeak and a defined signal spectral bin are determined to overlap if the photopeak and defined signal spectral bin have any energy in common.

In some such methods a photopeak and a defined signal spectral bin are determined to overlap if the photopeak and defined signal spectral bin have at least a predetermined fraction of the photopeak's included energies in common. The predetermined fraction can be, for example at least 10%, at least 25%, or at least 50%.

In some such methods a chosen signal spectral bin and a defined signal spectral bin are determined to overlap if the chosen signal spectral bin and the defined signal spectral bin have any energy in common.

In some such methods a chosen signal spectral bin and a defined signal spectral bin are determined to overlap if the chosen signal spectral bin and the defined signal spectral bin have at least a predetermined fraction of the chosen signal spectral bin's included energies in common. The predetermined fraction can be, for example at least 10%, at least 25%, or at least 50%.

In some such methods step (2) includes collecting in the memory from the network of at least one detector background data associated with energies lying within three background spectral bins, one of which includes a 1461 keV photopeak of $^{40}K$.

In some such methods step (4) includes estimating an expected number of background counts in at least one defined signal spectral bin by fitting a multi-component, linear model to the collected background data and evaluating the linear model at the at least one defined signal spectral bin energies. The multi-component model may be a three-component model.

Such methods can also include (6) repeating steps (2), (3), (4) and (5) for a plurality of predetermined time intervals, and/or collecting in steps (2) and (3) each detector's location and velocity.

In some such methods step (4) includes a particle filter process for detecting at least one radiation source. The particle filter process can include: if no ensemble exists, creating an ensemble of virtual particles, each virtual particle having at least an associated location, velocity and activity level; then for each virtual particle in the ensemble, computing a weight associated with the virtual particle, the weight being based on an estimate of a likelihood that the data collected in steps (2) and (3) originated from a radiation source having the location, velocity and activity level of the virtual particle; and then determining whether the computed weights collectively meet a predetermined detection criterion.

Such methods can also include collecting in steps (2) and (3) each detector's orientation, and angular velocity.

Such methods can also include modifying the ensemble of virtual particles by deleting from the ensemble any virtual particles having an associated weight below a predetermined threshold; and adding to the ensemble new virtual particles that are based on virtual particles having an associated weight above a predetermined threshold; thereby creating a new ensemble of virtual particles.

In some such methods the new virtual particles are copies of randomly selected virtual particles having an associated weight above a predetermined threshold.

In some such methods step (4) also includes determining a direction for at least one detector to move in during a subsequent predetermined time interval.

Similarly, methods of detecting a radiation source can make use of: a network of at least one detector, each detector being capable of detecting photons in a predetermined energy range; and a computer including: a processor; an input device; an output device; and a memory, the memory including: a predetermined list of a plurality of photopeaks, the list including for each photopeak an associated central energy, an associated energy width, and an associated isotope from which the photopeak originates; and a predetermined list of a plurality of energy bins within the predetermined energy range, such that each of the plurality of photopeaks on the predetermined list of photopeaks is associated with exactly one energy bin, and at least one energy bin is associated with an energy range within the predetermined energy range with which no photopeak on the predetermined list of photopeaks is associated; wherein an energy bin associated with an energy range with which no photopeak on the predetermined list of photopeaks is associated is referred to as a background spectral bin and an energy bin with which at least one photopeak on the predetermined list of photopeaks is associated is referred to as a signal spectral bin; the computer being capable of receiving by the input device and storing in the memory data collected at each of the detectors. Such methods can include (1) collecting, in the memory, from the network of at least one detector, during a predetermined time interval, background data associated with energies lying within the one or more background spectral bins; (2) collecting, in the memory, from the network of at least one detector, during the predetermined time interval, signal data associated with energies lying within at least one signal spectral bin; (3) combining, in the processor, the collected background data and signal data, thereby determining whether at least one radiation source has been detected in at least one signal spectral bin in the predetermined time interval; and (4) if at least one radiation source has been detected in at least one signal spectral bin in the predetermined time interval, outputting through the output device an indication that at least one radiation source has been detected.

Similarly, methods of detecting a radiation source can make use of: a network of at least one detector, each detector being capable of detecting photons in a predetermined energy range; and a computer including: a processor; an input device; an output device; and a memory, the memory including a predetermined list of a plurality of photopeaks, the list including for each photopeak an associated central energy, an associated energy width, and an associated isotope from which the photopeak originates; the computer being capable of receiving by the input device and storing in the memory data collected at each of the detectors. Such methods can include: defining a plurality of energy bins within the predetermined energy range, such that each of the plurality of photopeaks on the predetermined list is associated with exactly one energy bin, and at least one energy bin is associated with an energy range within the predetermined energy range with which no photopeak on the predetermined list is associated; wherein an energy bin associated with an energy range with which no photopeak on the predetermined list is associated is referred to as a background spectral bin and an energy bin with which at least one photopeak on the predetermined list is associated is referred to as a signal spectral bin.

Similarly, methods of detecting a radiation source can make use of: a network of at least one detector, each detector being capable of detecting photons in a predetermined energy range; and a computer including: a processor; an input device; an output device; and a memory, the memory including a predetermined list of a plurality of photopeaks, the list including for each photopeak an associated central energy, an associated energy width, and an associated isotope from which the photopeak originates; the computer being capable of receiving by the input device and storing in the memory data collected at each of the detectors. Such methods can include: (1) defining a plurality of energy bins within the predetermined energy range, such that each of the plurality of photopeaks on the predetermined list is associated with exactly one energy bin, and at least one energy bin is associated with an energy range within the predetermined energy range with which no photopeak on the predetermined list is associated; wherein an energy bin with which at least one photopeak on the predetermined list is associated is referred to as a signal spectral bin; (2) collecting, in the memory, from the network of at least one detector, during a predetermined time interval, signal data associated with energies lying within at least one signal spectral bin; (3) combining, in the processor, collected signal data from at least one signal spectral bin, and an estimate of the background radiation in the at least one signal spectral bin, and thereby determining whether at least one radiation source has been detected in at least one signal spectral bin in the predetermined time interval; and (4) if at least one radiation source has been detected in at least one signal spectral bin in the predetermined time interval, outputting through the output device an indication that at least one radiation source has been detected.

In some embodiments, the estimate of the background radiation can be based on guard bands defined on other side of each of the at least one signal spectral bin.

In some embodiments the estimate of the background radiation is based on erosion.

In some embodiments, step (1) can also include defining at least one energy bin associated with an energy range within the predetermined energy range with which no photopeak on the predetermined list is associated. Such methods may also include collecting, in the memory, from the network of at least one detector, during the predetermined time interval, background data associated with energies lying within the one or more background spectral bins. And in some embodiments the estimate of the background radiation is based on collected background data from at least one background spectral bin.

The various features described herein can be combined or omitted in various possible embodiments, as will be known to one of skill in the art.

TABLE 1

| Isotope | Energy of photopeak(s) in keV | Sources/Utility | Half-life |
|---|---|---|---|
| $^{232}$U | 583, 2615 | SNM related | 69 y |
| $^{228}$Ac | 910 | NORM (Th decay chain) | 6.15 h |
| $^{22}$Na | 511, 1274 | Standard Source | 2.6 y |
| $^{109}$Cd | 88 | Inspection | 463 d |
| $^{133}$Ba | 81, 303, 356 | Calibration Source | 10.51 y |
| $^{201}$Tl | 69, 71 | Medical | 3.04 d |
| $^{18}$F | 511 | Medical: PET positron = 1.656 MeV, 2 annihilation photons | 110 min |
| $^{131}$I | 364 | Fission product with medical use | 8.05 d |
| $^{99m}$Tc | 140 | Medical: SPECT | 6.02 h |
| $^{208}$Tl | 2614 | SNM related | 69 y |
| $^{40}$K | 1461 | NORM, e.g. Natural origin: cement | $1.2 \times 10^9$ y |
| $^{60}$Co | 1173, 1332 | Historically radiation therapy, inspection | 5.27 y |
| $^{137}$Cs | 662 | Inspection | 30.1 y |
| $^{57}$Co | 122, 136 | Medical tracer | 272 d |
| $^{241}$Am | 208, 59 | SNM related | 432 y |
| $^{238}$U | 1001 | SNM related | $4.5 \times 10^9$ y |
| $^{239}$Pu | 375, 414 | SNM | $2.4 \times 10^4$ y |
| $^{235}$U | 143, 186 | SNM | $7.0 \times 10^8$ y |

TABLE 2

| Bin # | Lower Bound (keV) | Upper Bound (keV) | Isotopes |
|---|---|---|---|
| 1 | 55 | 98 | $^{241}$Am, $^{210}$Tl, $^{133}$Ba, $^{109}$Cd |
| 2 | 109 | 158 | $^{57}$Co, $^{239}$Pu, $^{99m}$Tc, $^{235}$U |
| 3 | 166 | 229 | $^{235}$U, $^{241}$Am |
| 4 | 229 | 324 | NORM |
| 5 | 324 | 448 | $^{133}$Ba, $^{131}$I, $^{239}$Pu |
| 6 | 471 | 708 | $^{18}$F, $^{22}$Na, $^{232}$U, $^{137}$Cs |
| 7 | 708 | 855 | NORM |
| 8 | 855 | 1058 | $^{228}$Ac, $^{238}$U |
| 9 | 1111 | 1395 | $^{60}$Co, $^{22}$Na |
| 10 | 1395 | 1529 | $^{40}$K |
| 11 | 1529 | 2518 | NORM |
| 12 | 2518 | 2710 | $^{208}$Tl, $^{232}$U |

TABLE 3

| Bin # | Lower Bound (keV) | Upper Bound (keV) | Isotopes |
|---|---|---|---|
| 1 | 55 | 77 | $^{241}$Am, $^{210}$Tl |
| 2 | 71 | 98 | $^{133}$Ba, $^{109}$Cd |
| 3 | 107 | 144 | $^{57}$Co, $^{239}$Pu |
| 4 | 123 | 160 | $^{99m}$Tc, $^{235}$U |
| 5 | 165 | 205 | $^{235}$U |
| 6 | 186 | 230 | $^{241}$Am |
| 7 | 230 | 325 | NORM |
| 8 | 325 | 396 | $^{133}$Ba, $^{131}$I |
| 9 | 379 | 447 | $^{239}$Pu |
| 10 | 473 | 549 | $^{18}$F, $^{22}$Na |
| 11 | 542 | 624 | $^{232}$U |
| 12 | 618 | 706 | $^{137}$Cs |
| 13 | 706 | 857 | NORM |
| 14 | 857 | 963 | $^{228}$AC |
| 15 | 946 | 1056 | $^{238}$U |
| 16 | 1113 | 1233 | $^{60}$Co |
| 17 | 1212 | 1338 | $^{22}$Na |
| 18 | 1268 | 1396 | $^{60}$Co |
| 19 | 1394 | 1528 | $^{40}$K |
| 20 | 1528 | 2523 | NORM |
| 21 | 2523 | 2705 | $^{208}$Tl, $^{232}$U |

We claim:
1. A method of detecting a radiation source using:
a network of at least one detector, each detector being capable of detecting photons in a predetermined energy range; and
a computer including:
a processor;
an input device;
an output device; and
a memory;
the computer being capable of receiving by the input device and storing in the memory data collected at each of the detectors;
the method comprising:
(1) defining a plurality of energy bins within the predetermined energy range based on a predetermined list of a plurality of photopeaks, the list including for each photopeak an associated central energy, an associated energy width, and an associated isotope from which the photopeak originates, such that each of the plurality of photopeaks on the predetermined list is associated with at least one energy bin, and at least one energy bin is associated with an energy range within the predetermined energy range with which no photopeak on the predetermined list is associated;
wherein:
an energy bin associated with an energy range with which no photopeak on the predetermined list is associated is referred to as a background spectral bin; and
an energy bin with which at least one photopeak on the predetermined list is associated is referred to as a signal spectral bin;
(2) collecting, in the memory, from the network of at least one detector, during a predetermined time interval, background data associated with energies lying within the one or more background spectral bins;
(3) collecting, in the memory, from the network of at least one detector, during the predetermined time interval, signal data associated with energies lying within at least one signal spectral bin;
(4) combining, in the processor, at least collected background data from at least one background spectral bin and collected signal data from at least one signal spectral bin, thereby determining whether at least one radiation source has been detected in at least one signal spectral bin in the predetermined time interval;
(5) if at least one radiation source has been detected in at least one signal spectral bin in the predetermined time interval, outputting through the output device an indication that at least one radiation source has been detected; and
(6) repeating steps (2) through (5) a plurality of times.
2. The method of claim 1, wherein step (1) comprises:
(A) choosing a not-yet-chosen photopeak from the predetermined list;
(B) if the chosen photopeak does not overlap with a defined signal spectral bin, then defining a new signal spectral bin having:
(i) an associated signal spectral bin central energy equal to the central energy associated with the chosen photopeak; and
(ii) an associated signal spectral bin energy width equal to the energy width associated with the chosen photopeak; and
(C) if the chosen photopeak overlaps with at least one defined signal spectral bin then defining a new signal spectral bin to replace the at least one defined signal spectral bin which the chosen photopeak overlaps, the new signal spectral bin having
(i) an associated signal spectral bin central energy based on a combination of the central energies associated with the defined signal spectral bins which the chosen photopeak overlaps, and the central energy associated with the chosen photopeak, and
(ii) a new signal spectral bin energy width based on a combination of the energy widths associated with the defined signal spectral bins which the chosen photopeak overlaps, and the energy width associated with the chosen photopeak; and
(D) repeating steps (A) through (C) until each photopeak on the predetermined list has been chosen.
3. The method of claim 1, wherein step (1) comprises:
(A) choosing a not-yet-chosen photopeak from the predetermined list;
(B) if the chosen photopeak does not overlap with a defined signal spectral bin;
(i) then if the chosen photopeak does not overlap with any not-yet-chosen photopeak, defining a new signal spectral bin having:
(a) an associated signal spectral bin central energy equal to the central energy associated with the chosen photopeak; and
(b) an associated signal spectral bin energy width equal to the energy width associated with the chosen photopeak; and
(ii) then if the chosen photopeak overlaps with one or more not-yet-chosen photopeaks, determining whether any of the overlapping not-yet-chosen photopeaks overlaps with at least one defined signal spectral bin, and
(a) if none of the overlapping not-yet-chosen photopeaks overlaps with a defined signal spectral bin, defining a new signal spectral bin having
(I) an associated signal spectral bin central energy based on a combination of the central energies associated with the chosen photopeak and the one or more not-yet-chosen photopeaks overlapping the chosen photopeak, and
(II) an associated signal spectral bin energy width based on a combination of the energy widths associated with the chosen photopeak and the one or more not-yet-chosen photopeaks overlapping the chosen photopeak, and
classifying the not-yet-chosen photopeaks overlapping the chosen photopeak as chosen; and
(b) if at least one of the overlapping not-yet-chosen photopeaks overlaps with at least one defined signal spectral bin, defining a new signal spectral bin, to replace the at least one overlapping defined signal spectral bin, the new signal spectral bin having
(I) an associated signal spectral bin central energy based on a combination of the central energies associated with the chosen photopeak, the one or more not-yet-chosen photopeaks overlapping the chosen photopeak, and the at least one overlapping defined signal spectral bin; and
(II) an associated signal spectral bin energy width based on a combination of the energy widths associated with the chosen photopeak, the one or more not-yet-chosen photopeaks overlapping the chosen photopeak, and the at least one overlapping defined signal spectral bin; and classifying the not-yet-chosen photopeaks overlapping the chosen photopeak as chosen; and
(C) if the chosen photopeak overlaps with at least one defined signal spectral bin
  (i) then if the chosen photopeak does not overlap with any not-yet-chosen photopeak, defining a new signal spectral bin, to replace the at least one defined signal spectral bin which the chosen photopeak overlaps, the new signal spectral bin having
    (a) an associated signal spectral bin central energy based on a combination of the central energies associated with the defined signal spectral bins which the chosen photopeak overlaps, and the central energy associated with the chosen photopeak, and
    (b) a new signal spectral bin energy width based on a combination of the energy widths associated with the defined signal spectral bins which the chosen photopeak overlaps, and the energy width associated with the chosen photopeak; and
  (ii) then if the chosen photopeak overlaps with one or more not-yet-chosen photopeaks, determining whether any of the overlapping not-yet-chosen photopeaks overlaps with at least one defined signal spectral bin in addition to the defined signal spectral bins which the chosen photopeak overlaps, and
    (a) if none of the overlapping not-yet-chosen photopeaks overlaps with a defined signal spectral bin in addition to the defined signal spectral bins which the chosen photopeak overlaps, defining a new signal spectral bin, to replace the at least one defined signal spectral bin which the chosen photopeak overlaps, having
      (I) an associated signal spectral bin central energy based on a combination of the central energies associated with the defined signal spectral bins which the chosen photopeak overlaps, and the central energies associated with the chosen photopeak and with the one or more not-yet-chosen photopeaks overlapping the chosen photopeak, and
      (II) an associated signal spectral bin energy width based on a combination of the energy widths associated with the defined signal spectral bins which the chosen photopeak overlaps, and the energy widths associated with the chosen photopeak and with the one or more not-yet-chosen photopeaks overlapping the chosen photopeak; and
    classifying the not-yet-chosen photopeaks overlapping the chosen photopeak as chosen; and
    (b) if at least one of the overlapping not-yet-chosen photopeaks overlaps with at least one defined signal spectral bin in addition to the defined signal spectral bins which the chosen photopeak overlaps, defining a new signal spectral bin, to replace the at least one overlapping defined signal spectral bin, the new signal spectral bin having
      (I) an associated signal spectral bin central energy based on a combination of the central energies associated with the chosen photopeak, the one or more not-yet-chosen photopeaks overlapping the chosen photopeak, and the at least one overlapping defined signal spectral bin; and
      (II) an associated signal spectral bin energy width based on a combination of the energy widths associated with the chosen photopeak, the one or more not-yet-chosen photopeaks overlapping the chosen photopeak, and the at least one overlapping defined signal spectral bin; and
    classifying the not-yet-chosen photopeaks overlapping the chosen photopeak as chosen; and
(D) repeating steps (A) through (C) until each photopeak on the predetermined list has been chosen.

4. The method of claim 1, wherein step (1) comprises:
(A) for each photopeak on the predetermined list, defining a signal spectral bin having an upper bound and a lower bound based on the central energy and energy width associated with the chosen photopeak;
(B) ordering the signal spectral bins from lowest lower bound to highest lower bound;
(C) choosing a signal spectral bin that has a lowest lower bound of all non-yet chosen signal spectral bins;
(D) if the chosen signal spectral bin overlaps with any other signal spectral bins:
  (i) redefining the chosen signal spectral bin to have a lower bound equal to the lower bound of the chosen spectral bin and an upper bound equal to the highest upper bound of all the signal spectral bins that overlap the chosen bin;
  (ii) deleting the signal spectral bins that overlap the chosen bin;
  (iii) repeating step (D) based on the redefined chosen signal spectral bin; and
(E) repeating steps (C) and (D) until all signal spectral bins have been chosen.

5. The method of claim 1, wherein step (1) comprises:
(A) for each photopeak on the predetermined list, defining a signal spectral bin having:
  (i) an associated signal spectral bin central energy equal to the central energy associated with the chosen photopeak; and
  (ii) an associated signal spectral bin energy width equal to the energy width associated with the chosen photopeak;
(B) choosing a not-yet-chosen defined signal spectral bin;
(C) if the chosen defined signal spectral bin does not overlap with another defined signal spectral bin, then leaving the chosen defined signal spectral bin unchanged;
(D) if the chosen defined signal spectral bin does overlap with one or more other defined signal spectral bins then replacing both the chosen signal spectral bin and the overlapping other defined signal spectral bins with a new defined signal spectral bin having:
  (i) an associated signal spectral bin central energy based on a combination of the central energies associated with the chosen defined signal spectral bin and the one or more overlapping defined signal spectral bins; and
  (ii) an associated signal spectral bin energy width based on a combination of the energy widths associated with the chosen defined signal spectral bin and the one or more overlapping other defined signal spectral bins; and
  and classifying the new defined signal spectral bin as chosen; and
(E) repeating steps (B) through (D) until each signal spectral bin on the predetermined list has been chosen.

6. The method of claim 1 further comprising:
if a plurality of signal spectral bins exists, that are associated only with a set of photopeaks all of which originate from a same single isotope, then replacing the plurality of signal spectral bins with a single non-contiguous signal spectral bin associated with all of the set of photopeaks.

7. The method of claim 1 wherein the associated energy width for a photopeak on the predetermined list is the full width at a predetermined fraction of the maximum of the spectrum of the photopeak.

8. The method of claim 1 wherein the associated energy width for a photopeak on the predetermined list is the calculated second moment of the spectrum of the photopeak.

9. The method of claim 2 wherein a photopeak and a defined signal spectral bin are determined to overlap if the photopeak and defined signal spectral bin have any energy in common.

10. The method of claim 2 wherein a photopeak and a defined signal spectral bin are determined to overlap if the photopeak and defined signal spectral bin have at least a predetermined fraction of the photopeak's included energies in common.

11. The method of claim 10 wherein the predetermined fraction is at least 10%.

12. The method of claim 10 wherein the predetermined fraction is at least 25%.

13. The method of claim 10 wherein the predetermined fraction is at least 50%.

14. The method of claim 3 wherein a photopeak and a defined signal spectral bin are determined to overlap if the photopeak and defined signal spectral bin have any energy in common.

15. The method of claim 3 wherein a photopeak and a defined signal spectral bin are determined to overlap if the photopeak and defined signal spectral bin have at least a predetermined fraction of the photopeak's included energies in common.

16. The method of claim 15 wherein the predetermined fraction is at least 10%.

17. The method of claim 15 wherein the predetermined fraction is at least 25%.

18. The method of claim 15 wherein the predetermined fraction is at least 50%.

19. The method of claim 4 wherein the chosen signal spectral bin and a defined signal spectral bin are determined to overlap if the chosen signal spectral bin and the defined signal spectral bin have any energy in common.

20. The method of claim 4 wherein the chosen signal spectral bin and a defined signal spectral bin are determined to overlap if the chosen signal spectral bin and the defined signal spectral bin have at least a predetermined fraction of the chosen signal spectral bin's included energies in common.

21. The method of claim 20 wherein the predetermined fraction is at least 10%.

22. The method of claim 20 wherein the predetermined fraction is at least 25%.

23. The method of claim 20 wherein the predetermined fraction is at least 50%.

24. The method of claim 5 wherein the chosen signal spectral bin and a defined signal spectral bin are determined to overlap if the chosen signal spectral bin and the defined signal spectral bin have any energy in common.

25. The method of claim 5 wherein the chosen signal spectral bin and a defined signal spectral bin are determined to overlap if the chosen signal spectral bin and the defined signal spectral bin have at least a predetermined fraction of the chosen signal spectral bin's included energies in common.

26. The method of claim 25 wherein the predetermined fraction is at least 10%.

27. The method of claim 25 wherein the predetermined fraction is at least 25%.

28. The method of claim 25 wherein the predetermined fraction is at least 50%.

29. The method of claim 1 wherein:
step (2) includes collecting in the memory from the network of at least one detector background data associated with energies lying within three background spectral bins, one of which includes a 1461 keV photopeak of $^{40}K$.

30. The method of claim 1 wherein:
step (4) includes estimating an expected number of background counts in at least one defined signal spectral bin by fitting a multi-component, linear model to the collected background data and evaluating the linear model at the at least one defined signal spectral bin energies.

31. The method of claim 1 further comprising:
(6) repeating steps (2), (3), (4) and (5) for a plurality of predetermined time intervals.

32. The method of claim 31 further comprising collecting in steps (2) and (3) each detector's location and velocity.

33. The method of claim 32 wherein step (4) includes a particle filter process for detecting at least one radiation source, the particle filter process comprising:
if no ensemble exists, creating an ensemble of virtual particles, each virtual particle having at least an associated location, velocity and activity level; then
for each virtual particle in the ensemble, computing a weight associated with the virtual particle, the weight being based on an estimate of a likelihood that the data collected in steps (2) and (3) originated from a radiation source having the location, velocity and activity level of the virtual particle; and then
determining whether the computed weights collectively meet a predetermined detection criterion.

34. The method of claim 33 further comprising collecting in steps (2) and (3) each detector's orientation, and angular velocity.

35. The method of claim 33 further comprising:
modifying the ensemble of virtual particles by deleting from the ensemble any virtual particles having an associated weight below a predetermined threshold; and
adding to the ensemble new virtual particles that are based on virtual particles having an associated weight above a predetermined threshold;
thereby creating a new ensemble of virtual particles.

36. The method of claim 35 wherein the new virtual particles are copies of randomly selected virtual particles having an associated weight above a predetermined threshold.

37. The method of claim 32 wherein step (4) further comprises determining a direction for at least one detector to move in during a subsequent predetermined time interval.

38. A method of detecting a radiation source using:
a network of at least one detector, each detector being capable of detecting photons in a predetermined energy range; and
a computer including:
a processor;
an input device;
an output device; and
a memory, the memory including:
a predetermined list of a plurality of energy bins within the predetermined energy range, which are determined based on a predetermined list of a plurality of photopeaks, the list including for each photopeak an associated central energy, an associated energy width, and an associated isotope from which the photopeak originates, such that each of the plurality of photopeaks on the predetermined list of photopeaks is associated with at least one energy bin, and at least one energy bin is associated with an energy range within the predetermined energy range with which no photopeak on the predetermined list of photopeaks is associated;

wherein:
an energy bin associated with an energy range with which no photopeak on the predetermined list of photopeaks is associated is referred to as a background spectral bin; and
an energy bin with which at least one photopeak on the predetermined list of photopeaks is associated is referred to as a signal spectral bin;

the computer being capable of receiving by the input device and storing in the memory data collected at each of the detectors;

the method comprising:
(1) collecting, in the memory, from the network of at least one detector, during a predetermined time interval, background data associated with energies lying within the one or more background spectral bins;
(2) collecting, in the memory, from the network of at least one detector, during the predetermined time interval, signal data associated with energies lying within at least one signal spectral bin;
(3) combining, in the processor, the collected background data and signal data, thereby determining whether at least one radiation source has been detected in at least one signal spectral bin in the predetermined time interval; and
(4) if at least one radiation source has been detected in at least one signal spectral bin in the predetermined time interval, outputting through the output device an indication that at least one radiation source has been detected.

39. The method of claim 38, wherein the predetermined list of energy bins has been determined from the predetermined list of photopeaks by at least:
(A) choosing a not-yet-chosen photopeak from the predetermined list of photopeaks;
(B) if the chosen photopeak does not overlap with a defined signal spectral bin, then defining a new signal spectral bin having:
(i) an associated signal spectral bin central energy equal to the central energy associated with the chosen photopeak; and
(ii) an associated signal spectral bin energy width equal to the energy width associated with the chosen photopeak; and
(C) if the chosen photopeak overlaps with at least one defined signal spectral bin then defining a new signal spectral bin to replace the at least one defined signal spectral bin which the chosen photopeak overlaps, the new signal spectral bin having
(i) an associated signal spectral bin central energy based on a combination of the central energies associated with the defined signal spectral bins which the chosen photopeak overlaps, and the central energy associated with the chosen photopeak, and
(ii) a new signal spectral bin energy width based on a combination of the energy widths associated with the defined signal spectral bins which the chosen photopeak overlaps, and the energy width associated with the chosen photopeak;
(D) repeating steps (A) through (C) until each photopeak on the predetermined list of photopeaks has been chosen; and
(E) listing the defined signal spectral bins along with at least one background spectral bin, thereby forming the predetermined list of energy bins.

40. The method of claim 38, wherein the predetermined list of energy bins has been determined from the predetermined list of photopeaks by at least:
(A) choosing a not-yet-chosen photopeak from the predetermined list of photopeaks;
(B) if the chosen photopeak does not overlap with a defined signal spectral bin;
(i) then if the chosen photopeak does not overlap with any not-yet-chosen photopeak, defining a new signal spectral bin having:
(a) an associated signal spectral bin central energy equal to the central energy associated with the chosen photopeak; and
(b) an associated signal spectral bin energy width equal to the energy width associated with the chosen photopeak; and
(ii) then if the chosen photopeak overlaps with one or more not-yet-chosen photopeaks, determining whether any of the overlapping not-yet-chosen photopeaks overlaps with at least one defined signal spectral bin, and
(a) if none of the overlapping not-yet-chosen photopeaks overlaps with a defined signal spectral bin, defining a new signal spectral bin having
(I) an associated signal spectral bin central energy based on a combination of the central energies associated with the chosen photopeak and the one or more not-yet-chosen photopeaks overlapping the chosen photopeak, and
(II) an associated signal spectral bin energy width based on a combination of the energy widths associated with the chosen photopeak and the one or more not-yet-chosen photopeaks overlapping the chosen photopeak, and
classifying the not-yet-chosen photopeaks overlapping the chosen photopeak as chosen; and
(b) if at least one of the overlapping not-yet-chosen photopeaks overlaps with at least one defined signal spectral bin, defining a new signal spectral bin, to replace the at least one overlapping defined signal spectral bin, the new signal spectral bin having
(I) an associated signal spectral bin central energy based on a combination of the central energies associated with the chosen photopeak, the one or more not-yet-chosen photopeaks overlapping the chosen photopeak, and the at least one overlapping defined signal spectral bin; and
(II) an associated signal spectral bin energy width based on a combination of the energy widths associated with the chosen photopeak, the one or more not-yet-chosen photopeaks overlapping the chosen photopeak, and the at least one overlapping defined signal spectral bin; and
classifying the not-yet-chosen photopeaks overlapping the chosen photopeak as chosen; and (C) if the chosen photopeak overlaps with at least one defined signal spectral bin
  (i) then if the chosen photopeak does not overlap with any not-yet-chosen photopeak, defining a new signal spectral bin, to replace the at least one defined signal spectral bin which the chosen photopeak overlaps, the new signal spectral bin having
    (a) an associated signal spectral bin central energy based on a combination of the central energies associated with the defined signal spectral bins which the chosen photopeak overlaps, and the central energy associated with the chosen photopeak, and
    (b) a new signal spectral bin energy width based on a combination of the energy widths associated with the defined signal spectral bins which the chosen photopeak overlaps, and the energy width associated with the chosen photopeak; and
  (ii) then if the chosen photopeak overlaps with one or more not-yet-chosen photopeaks, determining whether any of the overlapping not-yet-chosen photopeaks overlaps with at least one defined signal spectral bin in addition to the defined signal spectral bins which the chosen photopeak overlaps, and
    (a) if none of the overlapping not-yet-chosen photopeaks overlaps with a defined signal spectral bin in addition to the defined signal spectral bins which the chosen photopeak overlaps, defining a new signal spectral bin, to replace the at least one defined signal spectral bin which the chosen photopeak overlaps, having
      (I) an associated signal spectral bin central energy based on a combination of the central energies associated with the defined signal spectral bins which the chosen photopeak overlaps, and the central energies associated with the chosen photopeak and with the one or more not-yet-chosen photopeaks overlapping the chosen photopeak, and
      (II) an associated signal spectral bin energy width based on a combination of the energy widths associated with the defined signal spectral bins which the chosen photopeak overlaps, and the energy widths associated with the chosen photopeak and with the one or more not-yet-chosen photopeaks overlapping the chosen photopeak; and
    classifying the not-yet-chosen photopeaks overlapping the chosen photopeak as chosen; and
    (b) if at least one of the overlapping not-yet-chosen photopeaks overlaps with at least one defined signal spectral bin in addition to the defined signal spectral bins which the chosen photopeak overlaps, defining a new signal spectral bin, to replace the at least one overlapping defined signal spectral bin, the new signal spectral bin having
      (I) an associated signal spectral bin central energy based on a combination of the central energies associated with the chosen photopeak, the one or more not-yet-chosen photopeaks overlapping the chosen photopeak, and the at least one overlapping defined signal spectral bin; and
      (II) an associated signal spectral bin energy width based on a combination of the energy widths associated with the chosen photopeak, the one or more not-yet-chosen photopeaks overlapping the chosen photopeak, and the at least one overlapping defined signal spectral bin; and
    classifying the not-yet-chosen photopeaks overlapping the chosen photopeak as chosen;
(D) repeating steps (A) through (C) until each photopeak on the predetermined list of photopeaks has been chosen; and
(E) listing the defined signal spectral bins along with at least one background spectral bin, thereby forming the predetermined list of energy bins.

41. The method of claim 38, wherein the predetermined list of energy bins has been determined from the predetermined list of photopeaks by at least:
(A) for each photopeak on the predetermined list of photopeaks, defining a signal spectral bin having an upper bound and a lower bound based on the central energy and energy width associated with the chosen photopeak;
(B) ordering the signal spectral bins from lowest lower bound to highest lower bound;
(C) choosing a signal spectral bin that has a lowest lower bound of all non-yet chosen signal spectral bins;
(D) if the chosen signal spectral bin overlaps with any other signal spectral bins:
  (i) redefining the chosen signal spectral bin to have a lower bound equal to the lower bound of the chosen spectral bin and an upper bound equal to the highest upper bound of all the signal spectral bins that overlap the chosen bin;
  (ii) deleting the signal spectral bins that overlap the chosen bin;
  (iii) repeating step (D) based on the redefined chosen signal spectral bin;
(E) repeating steps (C) and (D) until all signal spectral bins have been chosen; and
(F) listing the defined signal spectral bins along with at least one background spectral bin, thereby forming the predetermined list of energy bins.

42. The method of claim 38, wherein the predetermined list of energy bins has been determined from the predetermined list of photopeaks by at least:
(A) for each photopeak on the predetermined list of photopeaks, defining a signal spectral bin having:
  (ia) an associated signal spectral bin central energy equal to the central energy associated with the chosen photopeak; and
  (ii) an associated signal spectral bin energy width equal to the energy width associated with the chosen photopeak;
(B) choosing a not-yet-chosen defined signal spectral bin;
(C) if the chosen defined signal spectral bin does not overlap with another defined signal spectral bin, then leaving the chosen defined signal spectral bin unchanged;
(D) if the chosen defined signal spectral bin does overlap with one or more other defined signal spectral bins then replacing both the chosen signal spectral bin and the overlapping other defined signal spectral bins with a new defined signal spectral bin having:
  (i) an associated signal spectral bin central energy based on a combination of the central energies associated with the chosen defined signal spectral bin and the one or more overlapping defined signal spectral bins; and
  (ii) an associated signal spectral bin energy width based on a combination of the energy widths associated with the chosen defined signal spectral bin and the one or more overlapping other defined signal spectral bins; and and classifying the new defined signal spectral bin as chosen; and (E) repeating steps (B) through (D) until each signal spectral bin on the predetermined list of photopeaks has been chosen; and (F) listing the defined signal spectral bins along with at least one background spectral bin, thereby forming the predetermined list of energy bins.

43. The method of claim 38 further comprising:
if a plurality of signal spectral bins exists, that are associated only with a set of photopeaks all of which originate from a same single isotope, then replacing the plurality of signal spectral bins with a single non-contiguous signal spectral bin associated with all of the set of photopeaks.

44. The method of claim 38 wherein the associated energy width for a photopeak on the predetermined list is the full width at a predetermined fraction of the maximum of the spectrum of the photopeak.

45. The method of claim 38 wherein the associated energy width for a photopeak on the predetermined list is the calculated second moment of the spectrum of the photopeak.

46. The method of claim 39 wherein a photopeak and a defined signal spectral bin are determined to overlap if the photopeak and defined signal spectral bin have any energy in common.

47. The method of claim 39 wherein a photopeak and a defined signal spectral bin are determined to overlap if the photopeak and defined signal spectral bin have at least a predetermined fraction of the photopeak's included energies in common.

48. The method of claim 47 wherein the predetermined fraction is at least 10%.

49. The method of claim 47 wherein the predetermined fraction is at least 25%.

50. The method of claim 47 wherein the predetermined fraction is at least 50%.

51. The method of claim 40 wherein a photopeak and a defined signal spectral bin are determined to overlap if the photopeak and defined signal spectral bin have any energy in common.

52. The method of claim 40 wherein a photopeak and a defined signal spectral bin are determined to overlap if the photopeak and defined signal spectral bin have at least a predetermined fraction of the photopeak's included energies in common.

53. The method of claim 52 wherein the predetermined fraction is at least 10%.

54. The method of claim 52 wherein the predetermined fraction is at least 25%.

55. The method of claim 52 wherein the predetermined fraction is at least 50%.

56. The method of claim 41 wherein the chosen signal spectral bin and a defined signal spectral bin are determined to overlap if the chosen signal spectral bin and the defined signal spectral bin have any energy in common.

57. The method of claim 41 wherein the chosen signal spectral bin and a defined signal spectral bin are determined to overlap if the chosen signal spectral bin and the defined signal spectral bin have at least a predetermined fraction of the chosen signal spectral bin's included energies in common.

58. The method of claim 57 wherein the predetermined fraction is at least 10%.

59. The method of claim 57 wherein the predetermined fraction is at least 25%.

60. The method of claim 57 wherein the predetermined fraction is at least 50%.

61. The method of claim 42 wherein the chosen signal spectral bin and a defined signal spectral bin are determined to overlap if the chosen signal spectral bin and the defined signal spectral bin have any energy in common.

62. The method of claim 42 wherein the chosen signal spectral bin and a defined signal spectral bin are determined to overlap if the chosen signal spectral bin and the defined signal spectral bin have at least a predetermined fraction of the chosen signal spectral bin's included energies in common.

63. The method of claim 62 wherein the predetermined fraction is at least 10%.

64. The method of claim 62 wherein the predetermined fraction is at least 25%.

65. The method of claim 62 wherein the predetermined fraction is at least 50%.

66. The method of claim 38 wherein:
step (1) includes collecting in the memory from the network of at least one detector background data associated with energies lying within three background spectral bins, one of which includes a 1461 keV photopeak of $^{40}$K.

67. The method of claim 38 wherein:
step (3) includes estimating an expected number of background counts in at least one defined signal spectral bin by fitting a multi-component, linear model to the collected background data and evaluating the linear model at the at least one defined signal spectral bin energies.

68. The method of claim 38 further comprising:
(5) repeating steps (1), (2), (3) and (4) for a plurality of predetermined time intervals.

69. The method of claim 68 further comprising collecting in steps (1) and (2) each detector's location and velocity.

70. The method of claim 69 wherein step (3) includes a particle filter process for detecting at least one radiation source, the particle filter process comprising:
if no ensemble exists, creating an ensemble of virtual particles, each virtual particle having at least an associated location, velocity and activity level; then for each virtual particle in the ensemble, computing a weight associated with the virtual particle, the weight being based on an estimate of a likelihood that the data collected in steps (2) and (3) originated from a radiation source having the location, velocity and activity level of the virtual particle; and then determining whether the computed weights collectively meet a predetermined detection criterion.

71. The method of claim 70 further comprising collecting in steps (1) and (2) each detector's orientation, and angular velocity.

72. The method of claim 70 further comprising:
modifying the ensemble of virtual particles by deleting from the ensemble any virtual particles having an associated weight below a predetermined threshold; and adding to the ensemble new virtual particles that are based on virtual particles having an associated weight above a predetermined threshold;

thereby creating a new ensemble of virtual particles.

73. The method of claim 72 wherein the new virtual particles are copies of randomly selected virtual particles having an associated weight above a predetermined threshold.

74. The method of claim 69 wherein step (3) further comprises determining a direction for at least one detector to move in during a subsequent predetermined time interval.

75. A method of detecting a radiation source using:
a network of at least one detector, each detector being capable of detecting photons in a predetermined energy range; and
a computer including:
a processor;
an input device;
an output device; and
a memory;
the computer being capable of receiving by the input device and storing in the memory data collected at each of the detectors;
the method comprising:
defining a plurality of energy bins within the predetermined energy range, which are based on a predetermined list of a plurality of photopeaks, the list including for each photopeak an associated central energy, an associated energy width, and an associated isotope from which the photopeak originates, such that each of the plurality of photopeaks on the predetermined list is associated with at least one energy bin, and at least one energy bin is associated with an energy range within the predetermined energy range with which no photopeak on the predetermined list is associated;
wherein:
an energy bin associated with an energy range with which no photopeak on the predetermined list is associated is referred to as a background spectral bin; and
an energy bin with which at least one photopeak on the predetermined list is associated is referred to as a signal spectral bin.

76. The method of claim 75, wherein defining a plurality of energy bins comprises:
(A) choosing a not-yet-chosen photopeak from the predetermined list;
(B) if the chosen photopeak does not overlap with a defined signal spectral bin, then defining a new signal spectral bin having:
(i) an associated signal spectral bin central energy equal to the central energy associated with the chosen photopeak; and
(ii) an associated signal spectral bin energy width equal to the energy width associated with the chosen photopeak; and
(C) if the chosen photopeak overlaps with at least one defined signal spectral bin then defining a new signal spectral bin to replace the at least one defined signal spectral bin which the chosen photopeak overlaps, the new signal spectral bin having
(i) an associated signal spectral bin central energy based on a combination of the central energies associated with the defined signal spectral bins which the chosen photopeak overlaps, and the central energy associated with the chosen photopeak, and
(ii) a new signal spectral bin energy width based on a combination of the energy widths associated with the defined signal spectral bins which the chosen photopeak overlaps, and the energy width associated with the chosen photopeak; and
(D) repeating steps (A) through (C) until each photopeak on the predetermined list has been chosen.

77. The method of claim 75, wherein defining a plurality of energy bins comprises:
(A) choosing a not-yet-chosen photopeak from the predetermined list;
(B) if the chosen photopeak does not overlap with a defined signal spectral bin;
(i) then if the chosen photopeak does not overlap with any not-yet-chosen photopeak, defining a new signal spectral bin having:
(a) an associated signal spectral bin central energy equal to the central energy associated with the chosen photopeak; and
(b) an associated signal spectral bin energy width equal to the energy width associated with the chosen photopeak; and
(ii) then if the chosen photopeak overlaps with one or more not-yet-chosen photopeaks, determining whether any of the overlapping not-yet-chosen photopeaks overlaps with at least one defined signal spectral bin, and
(a) if none of the overlapping not-yet-chosen photopeaks overlaps with a defined signal spectral bin, defining a new signal spectral bin having
(I) an associated signal spectral bin central energy based on a combination of the central energies associated with the chosen photopeak and the one or more not-yet-chosen photopeaks overlapping the chosen photopeak, and
(II) an associated signal spectral bin energy width based on a combination of the energy widths associated with the chosen photopeak and the one or more not-yet-chosen photopeaks overlapping the chosen photopeak, and
classifying the not-yet-chosen photopeaks overlapping the chosen photopeak as chosen; and
(b) if at least one of the overlapping not-yet-chosen photopeaks overlaps with at least one defined signal spectral bin, defining a new signal spectral bin, to replace the at least one overlapping defined signal spectral bin, the new signal spectral bin having
(I) an associated signal spectral bin central energy based on a combination of the central energies associated with the chosen photopeak, the one or more not-yet-chosen photopeaks overlapping the chosen photopeak, and the at least one overlapping defined signal spectral bin; and
(II) an associated signal spectral bin energy width based on a combination of the energy widths associated with the chosen photopeak, the one or more not-yet-chosen photopeaks overlapping the chosen photopeak, and the at least one overlapping defined signal spectral bin; and
classifying the not-yet-chosen photopeaks overlapping the chosen photopeak as chosen; and
(C) if the chosen photopeak overlaps with at least one defined signal spectral bin
(i) then if the chosen photopeak does not overlap with any not-yet-chosen photopeak, defining a new signal spectral bin, to replace the at least one defined signal spectral bin which the chosen photopeak overlaps, the new signal spectral bin having
(a) an associated signal spectral bin central energy based on a combination of the central energies associated with the defined signal spectral bins which the chosen photopeak overlaps, and the central energy associated with the chosen photopeak, and (b) a new signal spectral bin energy width based on a combination of the energy widths associated with the defined signal spectral bins which the chosen photopeak overlaps, and the energy width associated with the chosen photopeak; and (ii) then if the chosen photopeak overlaps with one or more not-yet-chosen photopeaks, determining whether any of the overlapping not-yet-chosen photopeaks overlaps with at least one defined signal spectral bin in addition to the defined signal spectral bins which the chosen photopeak overlaps, and (a) if none of the overlapping not-yet-chosen photopeaks overlaps with a defined signal spectral bin in addition to the defined signal spectral bins which the chosen photopeak overlaps, defining a new signal spectral bin, to replace the at least one defined signal spectral bin which the chosen photopeak overlaps, having (I) an associated signal spectral bin central energy based on a combination of the central energies associated with the defined signal spectral bins which the chosen photopeak overlaps, and the central energies associated with the chosen photopeak and with the one or more not-yet-chosen photopeaks overlapping the chosen photopeak, and (II) an associated signal spectral bin energy width based on a combination of the energy widths associated with the defined signal spectral bins which the chosen photopeak overlaps, and the energy widths associated with the chosen photopeak and with the one or more not-yet-chosen photopeaks overlapping the chosen photopeak; and classifying the not-yet-chosen photopeaks overlapping the chosen photopeak as chosen; and (b) if at least one of the overlapping not-yet-chosen photopeaks overlaps with at least one defined signal spectral bin in addition to the defined signal spectral bins which the chosen photopeak overlaps, defining a new signal spectral bin, to replace the at least one overlapping defined signal spectral bin, the new signal spectral bin having (I) an associated signal spectral bin central energy based on a combination of the central energies associated with the chosen photopeak, the one or more not-yet-chosen photopeaks overlapping the chosen photopeak, and the at least one overlapping defined signal spectral bin; and (II) an associated signal spectral bin energy width based on a combination of the energy widths associated with the chosen photopeak, the one or more not-yet-chosen photopeaks overlapping the chosen photopeak, and the at least one overlapping defined signal spectral bin; and classifying the not-yet-chosen photopeaks overlapping the chosen photopeak as chosen; and (D) repeating steps (A) through (C) until each photopeak on the predetermined list has been chosen.

78. The method of claim 75, wherein defining a plurality of energy bins comprises:

(A) for each photopeak on the predetermined list, defining a signal spectral bin having an upper bound and a lower bound based on the central energy and energy width associated with the chosen photopeak;

(B) ordering the signal spectral bins from lowest lower bound to highest lower bound;

(C) choosing a signal spectral bin that has a lowest lower bound of all non-yet chosen signal spectral bins;

(D) if the chosen signal spectral bin overlaps with any other signal spectral bins:

(i) redefining the chosen signal spectral bin to have a lower bound equal to the lower bound of the chosen spectral bin and an upper bound equal to the highest upper bound of all the signal spectral bins that overlap the chosen bin;

(ii) deleting the signal spectral bins that overlap the chosen bin;

(iii) repeating step (D) based on the redefined chosen signal spectral bin; and (E) repeating steps (C) and (D) until all signal spectral bins have been chosen.

79. The method of claim 75, wherein defining a plurality of energy bins comprises:

(A) for each photopeak on the predetermined list, defining a signal spectral bin having:

(i) an associated signal spectral bin central energy equal to the central energy associated with the chosen photopeak; and (ii) an associated signal spectral bin energy width equal to the energy width associated with the chosen photopeak;

(B) choosing a not-yet-chosen defined signal spectral bin;

(C) if the chosen defined signal spectral bin does not overlap with another defined signal spectral bin, then leaving the chosen defined signal spectral bin unchanged;

(D) if the chosen defined signal spectral bin does overlap with one or more other defined signal spectral bins then replacing both the chosen signal spectral bin and the overlapping other defined signal spectral bins with a new defined signal spectral bin having:

(i) an associated signal spectral bin central energy based on a combination of the central energies associated with the chosen defined signal spectral bin and the one or more overlapping defined signal spectral bins; and (ii) an associated signal spectral bin energy width based on a combination of the energy widths associated with the chosen defined signal spectral bin and the one or more overlapping other defined signal spectral bins; and and classifying the new defined signal spectral bin as chosen; and (E) repeating steps (B) through (D) until each signal spectral bin on the predetermined list has been chosen.

80. The method of claim 75 further comprising:

if a plurality of signal spectral bins exists, that are associated only with a set of photopeaks all of which originate from a same single isotope, then replacing the plurality of signal spectral bins with a single non-contiguous signal spectral bin associated with all of the set of photopeaks.

81. The method of claim 75 wherein the associated energy width for a photopeak on the predetermined list is the full width at a predetermined fraction of the maximum of the spectrum of the photopeak.

82. The method of claim 75 wherein the associated energy width for a photopeak on the predetermined list is the calculated second moment of the spectrum of the photopeak.

83. The method of claim 76 wherein a photopeak and a defined signal spectral bin are determined to overlap if the photopeak and defined signal spectral bin have any energy in common.

84. The method of claim 76 wherein a photopeak and a defined signal spectral bin are determined to overlap if the photopeak and defined signal spectral bin have at least a predetermined fraction of the photopeak's included energies in common.

85. The method of claim 84 wherein the predetermined fraction is at least 10%.

86. The method of claim 84 wherein the predetermined fraction is at least 25%.

87. The method of claim 84 wherein the predetermined fraction is at least 50%.

88. The method of claim 77 wherein a photopeak and a defined signal spectral bin are determined to overlap if the photopeak and defined signal spectral bin have any energy in common.

89. The method of claim 77 wherein a photopeak and a defined signal spectral bin are determined to overlap if the photopeak and defined signal spectral bin have at least a predetermined fraction of the photopeak's included energies in common.

90. The method of claim 89 wherein the predetermined fraction is at least 10%.

91. The method of claim 89 wherein the predetermined fraction is at least 25%.

92. The method of claim 89 wherein the predetermined fraction is at least 50%.

93. The method of claim 78 wherein the chosen signal spectral bin and a defined signal spectral bin are determined to overlap if the chosen signal spectral bin and the defined signal spectral bin have any energy in common.

94. The method of claim 78 wherein the chosen signal spectral bin and a defined signal spectral bin are determined to overlap if the chosen signal spectral bin and the defined signal spectral bin have at least a predetermined fraction of the chosen signal spectral bin's included energies in common.

95. The method of claim 94 wherein the predetermined fraction is at least 10%.

96. The method of claim 94 wherein the predetermined fraction is at least 25%.

97. The method of claim 94 wherein the predetermined fraction is at least 50%.

98. The method of claim 79 wherein the chosen signal spectral bin and a defined signal spectral bin are determined to overlap if the chosen signal spectral bin and the defined signal spectral bin have any energy in common.

99. The method of claim 79 wherein the chosen signal spectral bin and a defined signal spectral bin are determined to overlap if the chosen signal spectral bin and the defined signal spectral bin have at least a predetermined fraction of the chosen signal spectral bin's included energies in common.

100. The method of claim 99 wherein the predetermined fraction is at least 10%.

101. The method of claim 99 wherein the predetermined fraction is at least 25%.

102. The method of claim 99 wherein the predetermined fraction is at least 50%.

103. A method of detecting a radiation source using:
a network of at least one detector, each detector being capable of detecting photons in a predetermined energy range; and
a computer including:
   a processor;
   an input device;
   an output device; and
   a memory;
the computer being capable of receiving by the input device and storing in the memory data collected at each of the detectors;
the method comprising:
(1) defining a plurality of energy bins within the predetermined energy range based on a predetermined list of a plurality of photopeaks, the list including for each photopeak an associated central energy, an associated energy width, and an associated isotope from which the photopeak originates, such that each of the plurality of photopeaks on the predetermined list is associated with at least one energy bin;
   wherein an energy bin with which at least one photopeak on the predetermined list is associated is referred to as a signal spectral bin;
(2) collecting, in the memory, from the network of at least one detector, during a predetermined time interval, signal data associated with energies lying within at least one signal spectral bin;
(3) combining, in the processor, collected signal data from at least one signal spectral bin, and an estimate of the background radiation in the at least one signal spectral bin, and thereby determining whether at least one radiation source has been detected in at least one signal spectral bin in the predetermined time interval;
(4) if at least one radiation source has been detected in at least one signal spectral bin in the predetermined time interval, outputting through the output device an indication that at least one radiation source has been detected; and
(5) repeating steps (2) through (4) a plurality of times;
wherein step (1) comprises:
(A) choosing a not-yet-chosen photopeak from the predetermined list;
(B) if the chosen photopeak does not overlap with a defined signal spectral bin, then defining a new signal spectral bin having:
   (i) an associated signal spectral bin central energy equal to the central energy associated with the chosen photopeak; and
   (ii) an associated signal spectral bin energy width equal to the energy width associated with the chosen photopeak; and
(C) if the chosen photopeak overlaps with at least one defined signal spectral bin then defining a new signal spectral bin to replace the at least one defined signal spectral bin which the chosen photopeak overlaps, the new signal spectral bin having
   (i) an associated signal spectral bin central energy based on a combination of the central energies associated with the defined signal spectral bins which the chosen photopeak overlaps, and the central energy associated with the chosen photopeak, and
   (ii) a new signal spectral bin energy width based on a combination of the energy widths associated with the defined signal spectral bins which the chosen photopeak overlaps, and the energy width associated with the chosen photopeak; and
(D) repeating steps (A) through (C) until each photopeak on the predetermined list has been chosen.

104. The method of claim 103 wherein:
step (1) further comprises defining at least one energy bin associated with an energy range within the predetermined energy range with which no photopeak on the predetermined list is associated;
the method further comprises collecting, in the memory, from the network of at least one detector, during the predetermined time interval, background data associated with energies lying within the one or more background spectral bins; and
the estimate of the background radiation is based on collected background data from at least one background spectral bin.

105. The method of claim 103 wherein the estimate of the background radiation is based on guard bands defined on other side of each of the at least one signal spectral bin.

106. The method of claim 103 wherein the estimate of the background radiation is based on erosion.

* * * * *